US010378506B2

(12) United States Patent
Han

(10) Patent No.: US 10,378,506 B2
(45) Date of Patent: Aug. 13, 2019

(54) COMMUTATOR-LESS AND BRUSH-LESS DIRECT CURRENT GENERATOR AND APPLICATIONS FOR GENERATING POWER TO AN ELECTRIC POWER SYSTEM

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 15/707,138

(22) Filed: Sep. 18, 2017

(65) Prior Publication Data
US 2018/0038340 A1     Feb. 8, 2018

Related U.S. Application Data

(60) Continuation-in-part of application No. 15/267,655, filed on Sep. 15, 2016, now Pat. No. 9,912,209, which
(Continued)

(51) Int. Cl.
*F03B 15/02*     (2006.01)
*F03B 3/18*     (2006.01)
(Continued)

(52) U.S. Cl.
CPC ............... *F03B 15/02* (2013.01); *F03B 3/18* (2013.01); *F03B 13/264* (2013.01); *F03B 15/08* (2013.01);
(Continued)

(58) Field of Classification Search
USPC .......................... 290/43, 52, 53; 60/500–509
See application file for complete search history.

(56) References Cited

U.S. PATENT DOCUMENTS 3,210,644 A * 10/1965 Sparrow ................ H02K 19/38
    310/68 R
4,035,711 A * 7/1977 Piller ....................... H02K 5/24
    361/695
(Continued)

FOREIGN PATENT DOCUMENTS

JP     2009273268 A   *   11/2009
WO    WO9214298       8/1992

*Primary Examiner* — Pedro J Cuevas
(74) *Attorney, Agent, or Firm* — Cameron LLP

(57) ABSTRACT

Three controls, three variable gear assemblies, an optional hatch or variable propeller pitch, and a variable overlap generator (VO generator), as well as one or more commutator and brush-less free direct current generators may be used independently and together to provide constant frequency and voltage output power and to increase the amount of output power generated with the same input water flow or wind speed in a plurality of embodiments useful in wind power generation and water renewable energy generators for any of tidal and ocean current or wave conditions. Two Transgear™ assemblies side-by-side and sharing the same central shaft may comprise a constant speed motor control, produce required constant frequency and voltage and be reduced in part count and complexity. The variable overlap generator of a marine hydrokinetic or wind power generator may be used as a low torque generator, a high power-rated generator or a control in these applications and may generate more electric power than a conventional fixed power generator (the rotor axially aligned to overlap the stator in a conventional manner) over a wider input range. An electromotive force (EMF) embodiment generates alternating current at constant frequency and voltage in varying wind and water speed conditions.

20 Claims, 25 Drawing Sheets

Variable Overlap Generator (VO Generator).
The power rating of VOG is greater than that of FOG.

Related U.S. Application Data is a continuation-in-part of application No. 14/838,867, filed on Aug. 28, 2015, now Pat. No. 9,476,401, which is a continuation-in-part of application No. 14/829,354, filed on Aug. 18, 2015, now Pat. No. 9,490,736, which is a continuation-in-part of application No. 14/255,377, filed on Apr. 17, 2014, now Pat. No. 9,151,269, which is a continuation-in-part of application No. 13/915,785, filed on Jun. 12, 2013, now Pat. No. 8,702,552, which is a division of application No. 13/568,288, filed on Aug. 7, 2012, now Pat. No. 8,485,933, which is a continuation-in-part of application No. 13/425,501, filed on Mar. 21, 2012, now Pat. No. 8,641,570, which is a continuation-in-part of application No. 13/384,621, filed as application No. PCT/US2010/042519 on Jul. 20, 2010, now Pat. No. 8,388,481.

(60) Provisional application No. 62/409,549, filed on Oct. 18, 2016, provisional application No. 62/039,096, filed on Aug. 19, 2014, provisional application No. 61/521,408, filed on Aug. 9, 2011, provisional application No. 61/523,846, filed on Aug. 16, 2011.

(51) Int. Cl.

| | |
|---|---|
| *F03D 15/00* | (2016.01) |
| *F03B 15/08* | (2006.01) |
| *F03D 7/02* | (2006.01) |
| *F03B 13/26* | (2006.01) |
| *F03B 15/12* | (2006.01) |
| *F03B 17/06* | (2006.01) |
| *H02K 19/18* | (2006.01) |
| *H02K 1/27* | (2006.01) |
| *H02K 7/116* | (2006.01) |
| *H02K 7/18* | (2006.01) |
| *H02K 11/21* | (2016.01) |
| *F03D 9/25* | (2016.01) |
| *F16H 3/52* | (2006.01) |
| *F16H 15/50* | (2006.01) |
| *F16H 3/56* | (2006.01) |
| *F16H 3/62* | (2006.01) |
| *F16H 29/04* | (2006.01) |
| *F16H 25/04* | (2006.01) |
| *F03D 3/00* | (2006.01) |
| *F03D 3/04* | (2006.01) |

(52) U.S. Cl.
CPC ............ *F03B 15/12* (2013.01); *F03B 17/063* (2013.01); *F03D 7/0272* (2013.01); *F03D 9/25* (2016.05); *F03D 15/00* (2016.05); *F16H 3/52* (2013.01); *F16H 3/56* (2013.01); *F16H 3/62* (2013.01); *F16H 15/50* (2013.01); *F16H 25/04* (2013.01); *F16H 29/04* (2013.01); *H02K 1/2753* (2013.01); *H02K 7/116* (2013.01); *H02K 7/183* (2013.01); *H02K 11/21* (2016.01); *H02K 19/18* (2013.01); *F03D 3/002* (2013.01); *F03D 3/0436* (2013.01); *F05B 2210/16* (2013.01); *F05B 2220/32* (2013.01); *F05B 2220/7062* (2013.01); *F05B 2240/93* (2013.01); *F05B 2240/97* (2013.01); *F05B 2260/402* (2013.01); *F05B 2260/404* (2013.01); *F05B 2260/40311* (2013.01); *F05B 2270/101* (2013.01); *F05B 2270/32* (2013.01); *Y02E 10/223* (2013.01); *Y02E 10/226* (2013.01); *Y02E 10/28* (2013.01); *Y02E 10/722* (2013.01); *Y02E 10/723* (2013.01); *Y02E 10/725* (2013.01); *Y10T 74/18056* (2015.01); *Y10T 74/18296* (2015.01); *Y10T 74/18792* (2015.01); *Y10T 74/2101* (2015.01)

(56) References Cited

U.S. PATENT DOCUMENTS

| | | | | |
|---|---|---|---|---|
| 4,069,985 | A * | 1/1978 | Lohest | B65H 54/40 242/486 |
| 4,098,084 | A * | 7/1978 | Cockerell | F03B 13/20 417/332 |
| 4,118,932 | A * | 10/1978 | Sivill | F03B 13/20 417/332 |
| 4,319,454 | A * | 3/1982 | Lucia | F03B 13/1815 417/332 |
| 4,389,843 | A * | 6/1983 | Lamberti | F03B 13/1815 290/42 |
| 4,408,455 | A * | 10/1983 | Montgomery | F03B 13/1815 60/497 |
| 4,449,028 | A * | 5/1984 | Buxton | B23K 11/252 219/109 |
| 4,945,334 | A * | 7/1990 | Biersach | G08B 3/10 116/137 R |
| 5,132,550 | A * | 7/1992 | McCabe | B01D 61/10 290/53 |
| 5,621,777 | A * | 4/1997 | Ring | H02J 9/062 318/161 |
| 6,250,585 | B1 * | 6/2001 | Pell | B64C 33/00 244/22 |
| 6,315,503 | B1 * | 11/2001 | Oswald | B23B 29/03457 408/1 R |
| 6,343,899 | B1 * | 2/2002 | Straub | B23B 29/03482 408/150 |
| 6,752,571 | B2 * | 6/2004 | Oswald | B23B 29/03457 408/156 |
| 7,218,015 | B2 * | 5/2007 | Engelhardt | H02J 3/12 307/103 |
| 7,315,092 | B2 * | 1/2008 | Cook | F03B 13/20 290/42 |
| 7,884,562 | B2 * | 2/2011 | Klatt | B60Q 1/30 318/400.01 |
| 8,248,006 | B2 * | 8/2012 | Klatt | B60Q 1/30 318/400.01 |
| 8,314,506 | B2 * | 11/2012 | Rhinefrank | F03B 13/20 290/53 |
| 8,338,481 | B2 | 3/2013 | Han | |
| 8,388,481 | B2 * | 3/2013 | Han | H02P 9/04 475/170 |
| 8,485,933 | B2 | 7/2013 | Han | |
| 8,508,063 | B2 * | 8/2013 | Rhinefrank | F03B 13/20 290/53 |
| 8,659,179 | B2 * | 2/2014 | Rhinefrank | F03B 13/20 290/53 |
| 8,702,552 | B2 | 4/2014 | Han | |
| 8,773,050 | B2 * | 7/2014 | Klatt | B60Q 1/30 318/400.01 |
| 8,986,149 | B2 | 3/2015 | Han | |
| 8,992,370 | B2 | 3/2015 | Han | |
| 9,114,559 | B2 * | 8/2015 | Finger | B29C 49/12 |
| 9,151,269 | B2 | 10/2015 | Han | |
| 9,169,772 | B2 | 10/2015 | Han | |
| 9,435,317 | B2 * | 9/2016 | Cunningham | F03B 13/20 |
| 9,476,401 | B2 * | 10/2016 | Han | F03B 13/264 |
| 9,490,736 | B2 * | 11/2016 | Han | H02P 9/02 |
| 9,539,914 | B2 * | 1/2017 | Klatt | B60L 15/20 |
| 9,587,620 | B2 * | 3/2017 | Rhinefrank | F03B 13/14 |
| 9,887,557 | B2 * | 2/2018 | Corum | H02J 50/10 |
| 9,912,209 | B2 * | 3/2018 | Han | F03D 3/002 |
| 2002/0025233 | A1 * | 2/2002 | Oswald | B23B 29/03457 408/153 |
| 2004/0008014 | A1 * | 1/2004 | Engelhardt | H02J 3/12 323/273 |
| 2006/0208494 | A1 * | 9/2006 | Cook | F03B 13/20 290/53 |

(56) References Cited

U.S. PATENT DOCUMENTS

| | | | |
|---|---|---|---|
| 2008/0169653 A1* | 7/2008 | Olson | F03B 13/1815 290/53 |
| 2009/0108782 A1* | 4/2009 | Klatt | B60Q 1/30 318/400.17 |
| 2010/0147605 A1* | 6/2010 | Klatt | B60Q 1/30 180/65.1 |
| 2010/0148712 A1* | 6/2010 | Klatt | B60Q 1/30 318/400.42 |
| 2011/0260373 A1* | 10/2011 | Finger | B29C 49/12 264/532 |
| 2012/0115662 A1* | 5/2012 | Han | H02P 9/04 475/31 |
| 2013/0239562 A1 | 9/2013 | Yemm | |
| 2013/0277123 A1* | 10/2013 | Klatt | B60L 15/20 180/6.44 |
| 2013/0277974 A1* | 10/2013 | Klatt | F16H 1/10 290/50 |
| 2014/0079839 A1* | 3/2014 | Finger | B29C 49/12 425/150 |
| 2014/0246900 A1* | 9/2014 | Klatt | B60L 15/20 307/9.1 |
| 2014/0299392 A9* | 10/2014 | Klatt | B60L 15/20 307/9.1 |
| 2015/0357951 A1* | 12/2015 | Han | H02P 9/02 290/43 |
| 2016/0010620 A1* | 1/2016 | Han | F03B 13/264 290/43 |
| 2016/0079770 A1* | 3/2016 | Corum | H02J 50/10 307/104 |
| 2017/0030326 A1* | 2/2017 | Han | F03D 3/002 |
| 2017/0098989 A1* | 4/2017 | Kitada | H02K 16/04 |
| 2018/0183242 A1* | 6/2018 | Corum | H02J 50/10 |
| 2018/0195582 A1* | 7/2018 | Han | F16H 3/724 |

* cited by examiner

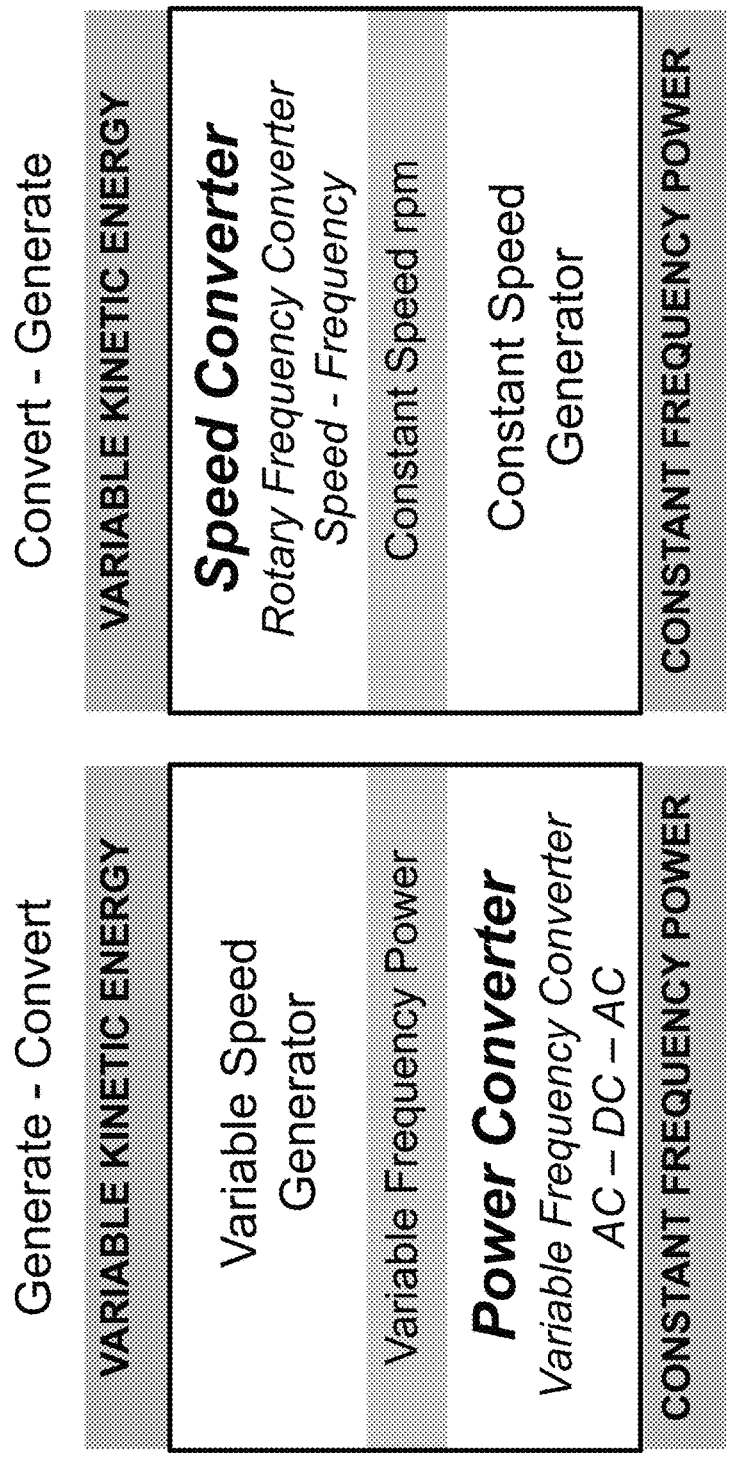
Figure 1(A) Power Converter (Prior Art)    Figure 1(B) Speed Converter

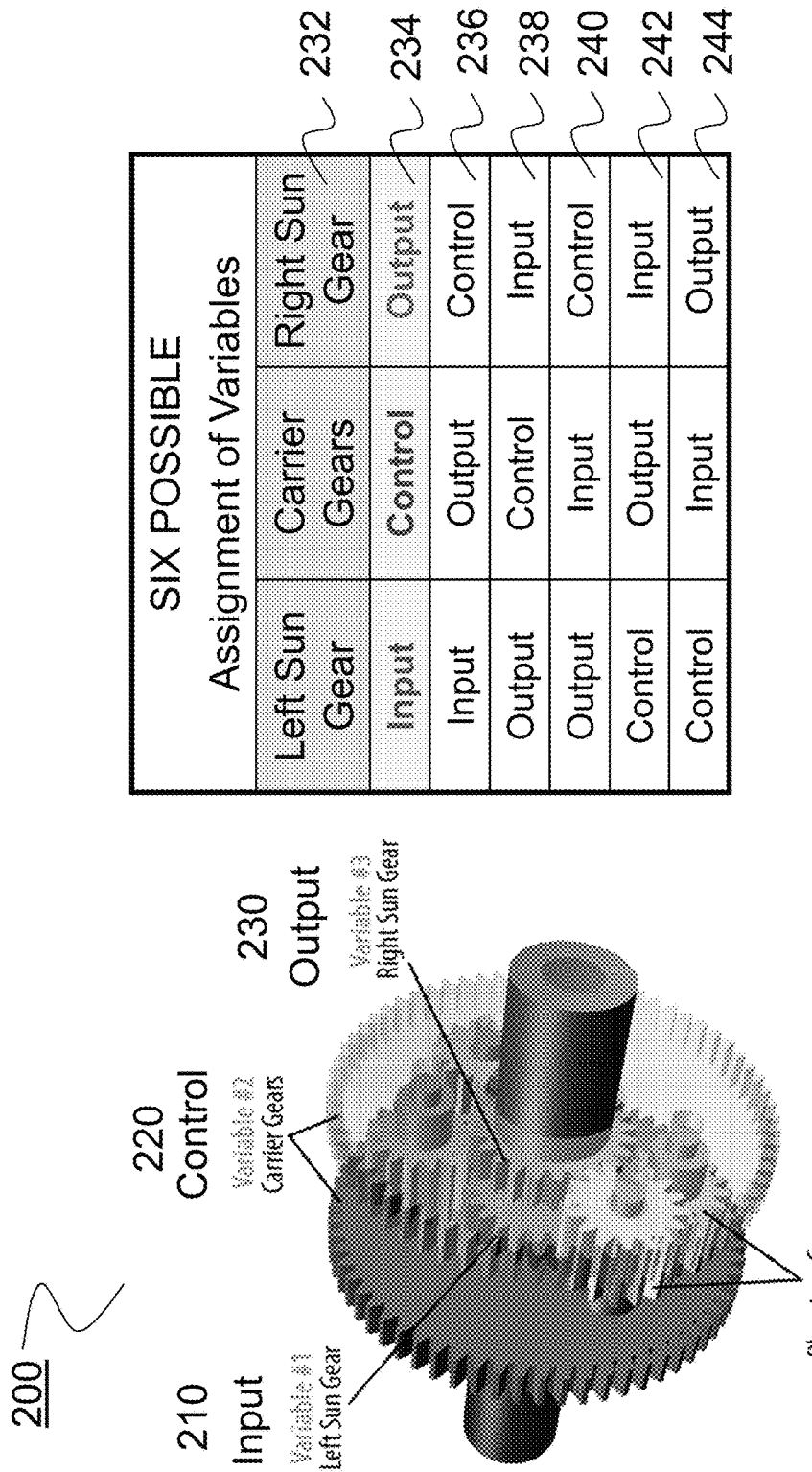
Figure 2. Basic Spur Gear Transgear

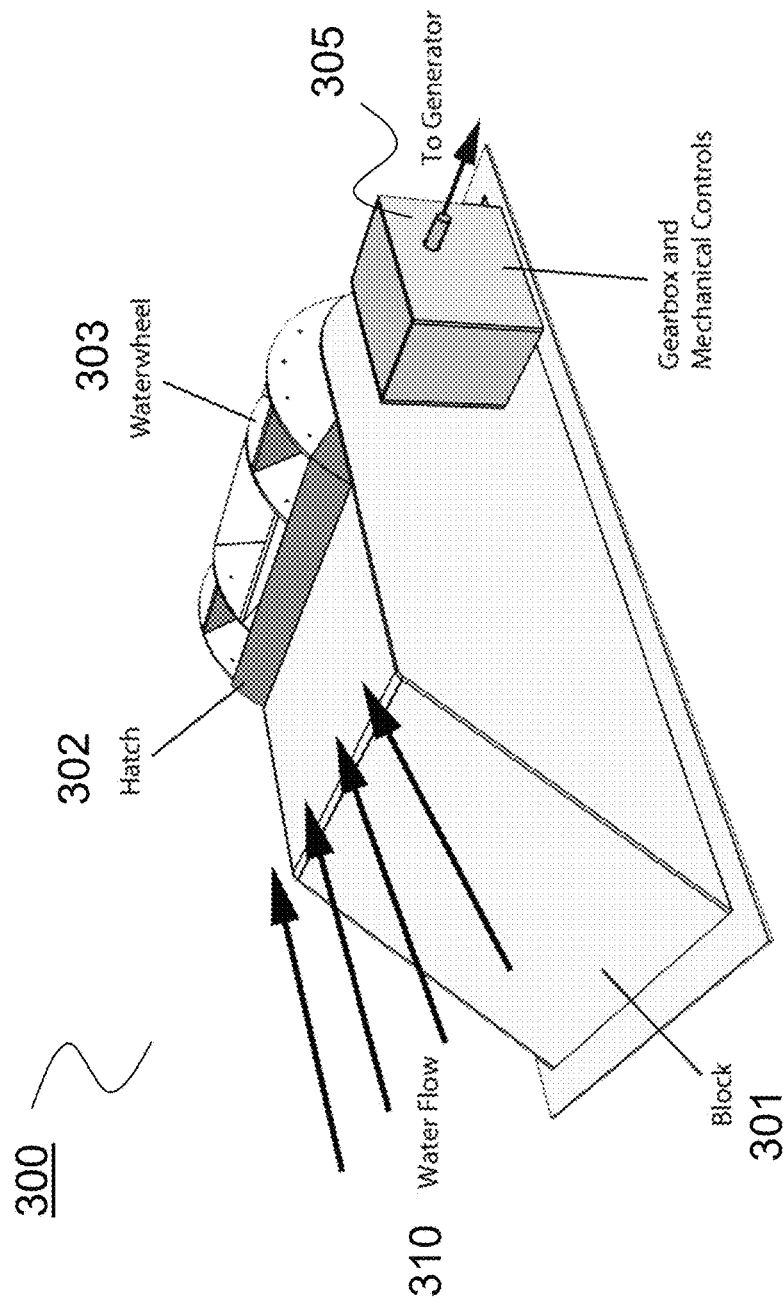
Figure 3. River and Ocean Current Turbines

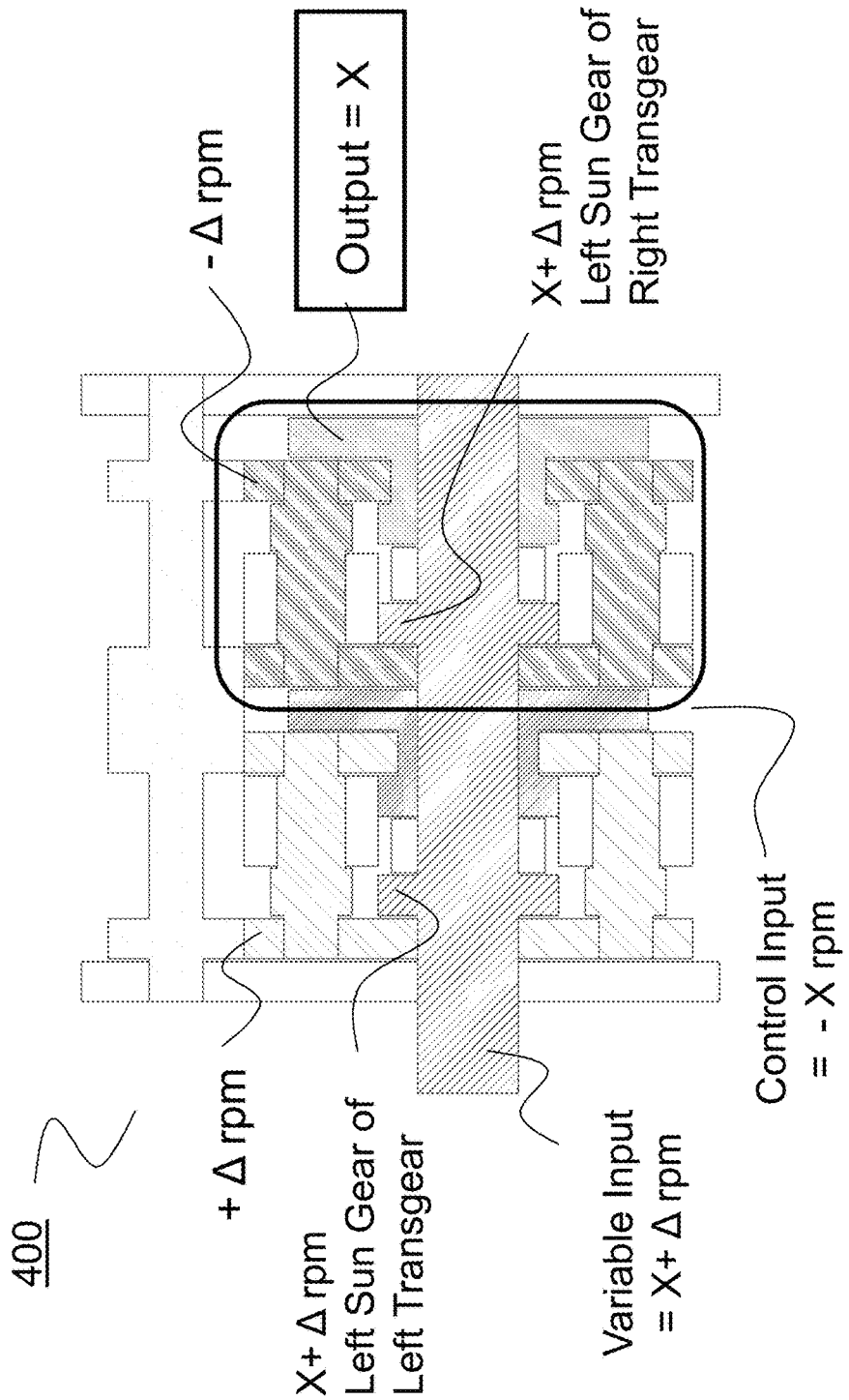
Figure 4. Speed Converter "Hummingbird"

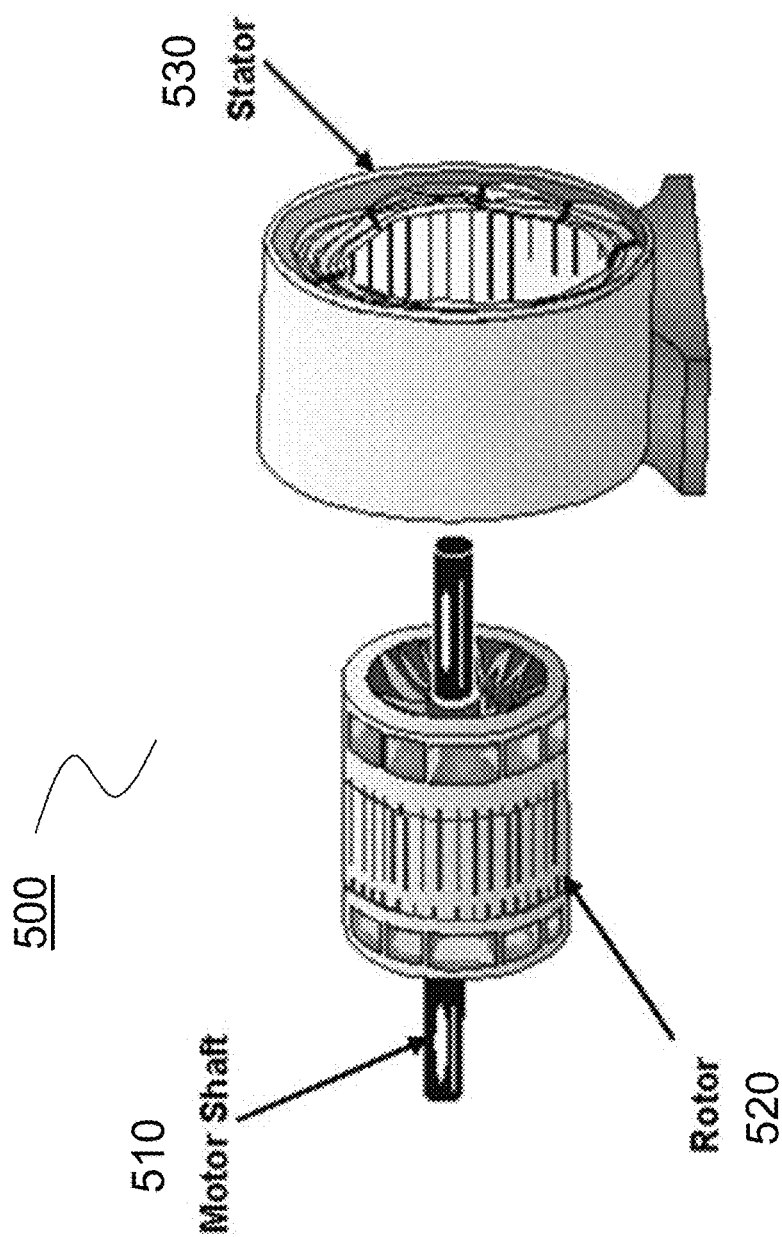
Figure 5. Variable Overlap Generator

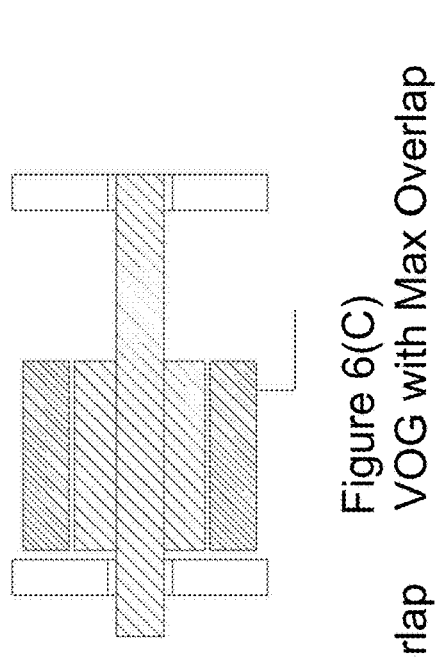

Figure 6(A)
Fixed Overlap Generator

Figure 6(B)
VOG with Min Overlap

Figure 6(C)
VOG with Max Overlap

| Fixed Overlap Generator (FOG) | Variable Overlap Generator (VOG) | |
|---|---|---|
| Fig 6(A): Fixed Overlap | Fig 6(B): Minimum Overlap | Fig 6(C): Maximum Overlap |
| Fixed Torque | The minimum torque of VOG is less than that of FOG | |
| Fixed Rated Power | | The maximum rated power of VOG is greater than that of FOG |

Figure 6(D). Variable Overlap Generator (VO Generator). The power rating of VOG is greater than that of FOG.

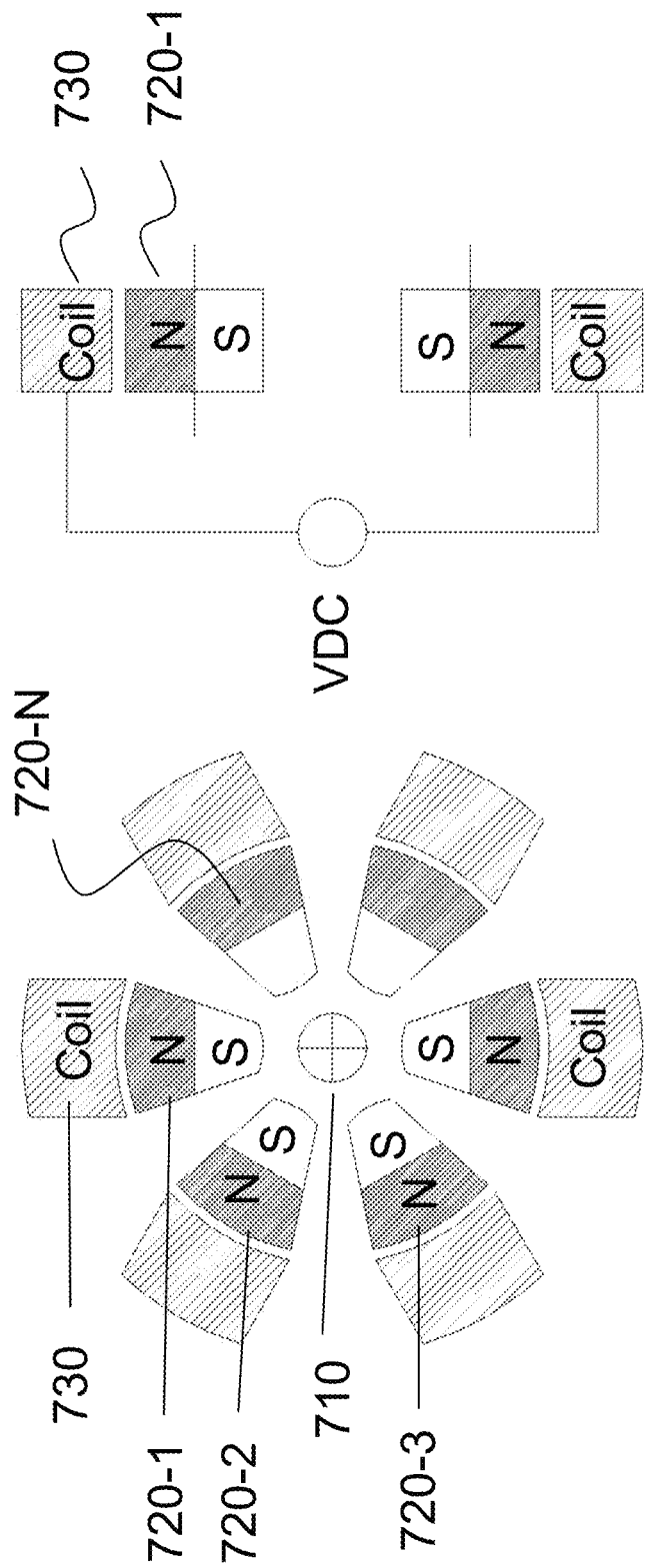
Figure 7(B) Side View
Figure 7(A) Top View

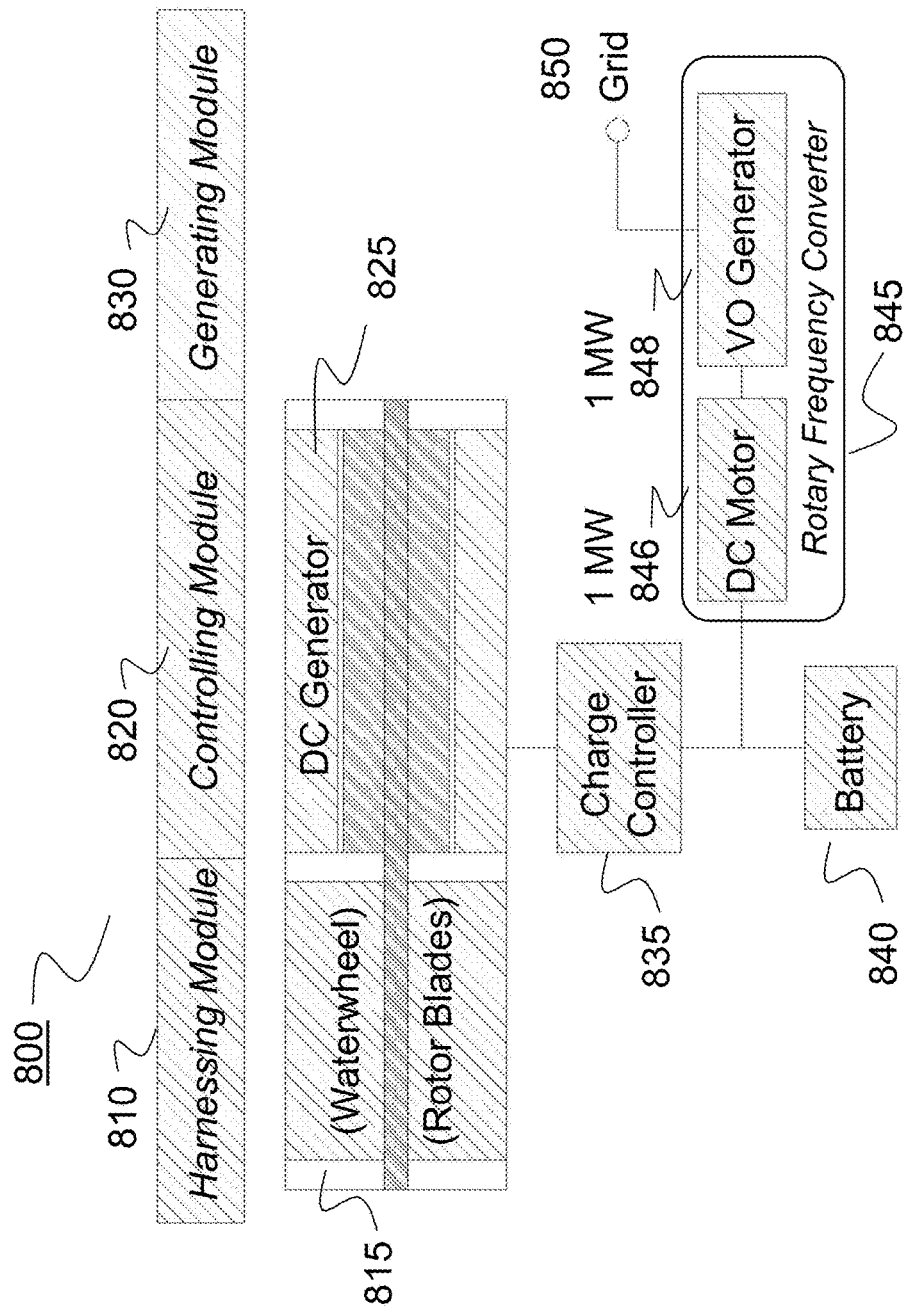
Figure 8. Control Circuit #1: Basic Rotary Frequency Converter

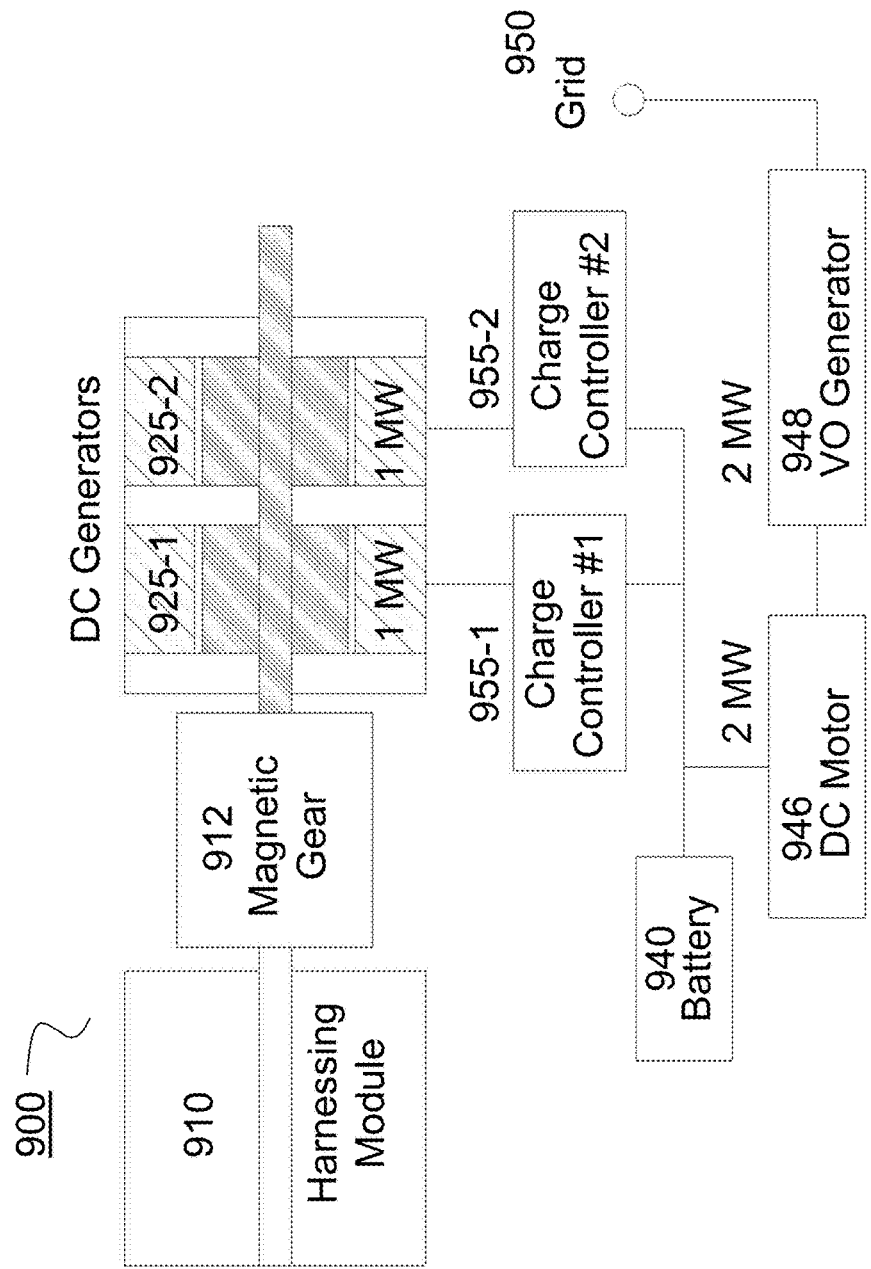
Figure 9. Control Circuit #2: Multiple Charge Controllers

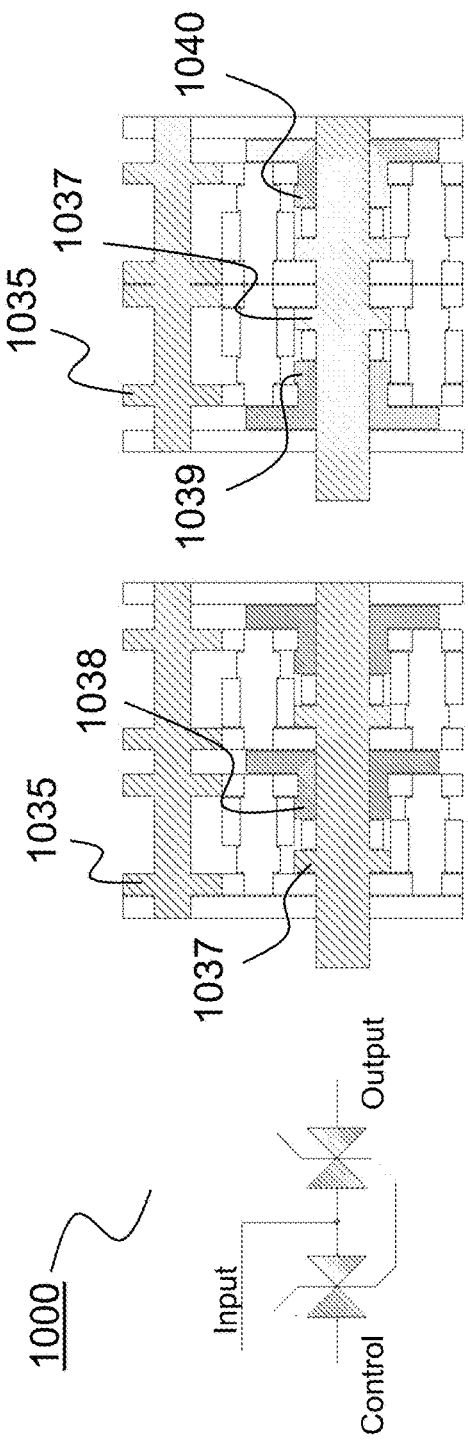
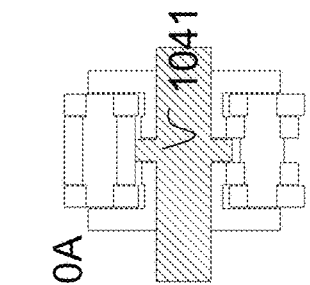
Figure 10(C)
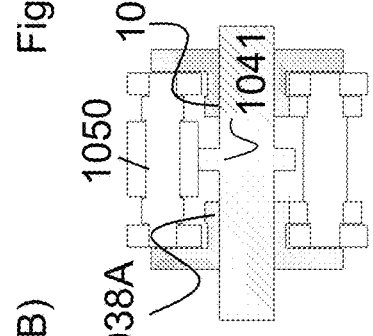
Figure 10(B)
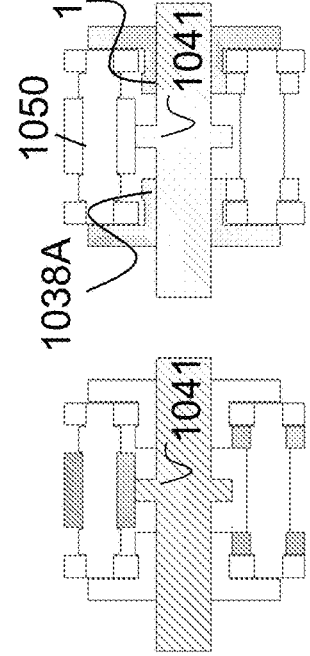
Figure 10(F)    Figure 10(G)
Figure 10(A)
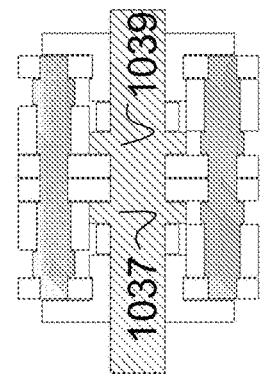
Figure 10(E)
Figure 10(D)

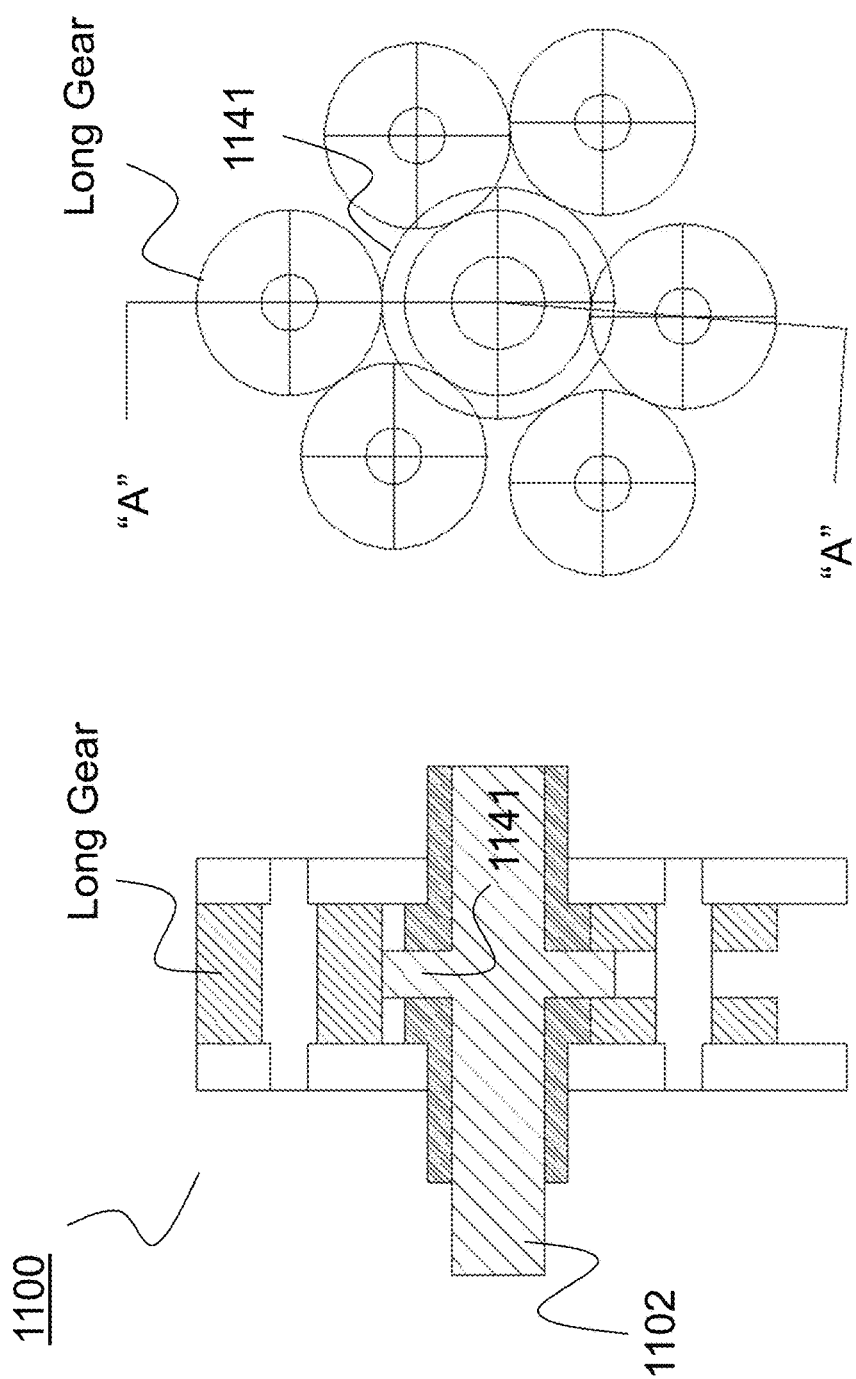

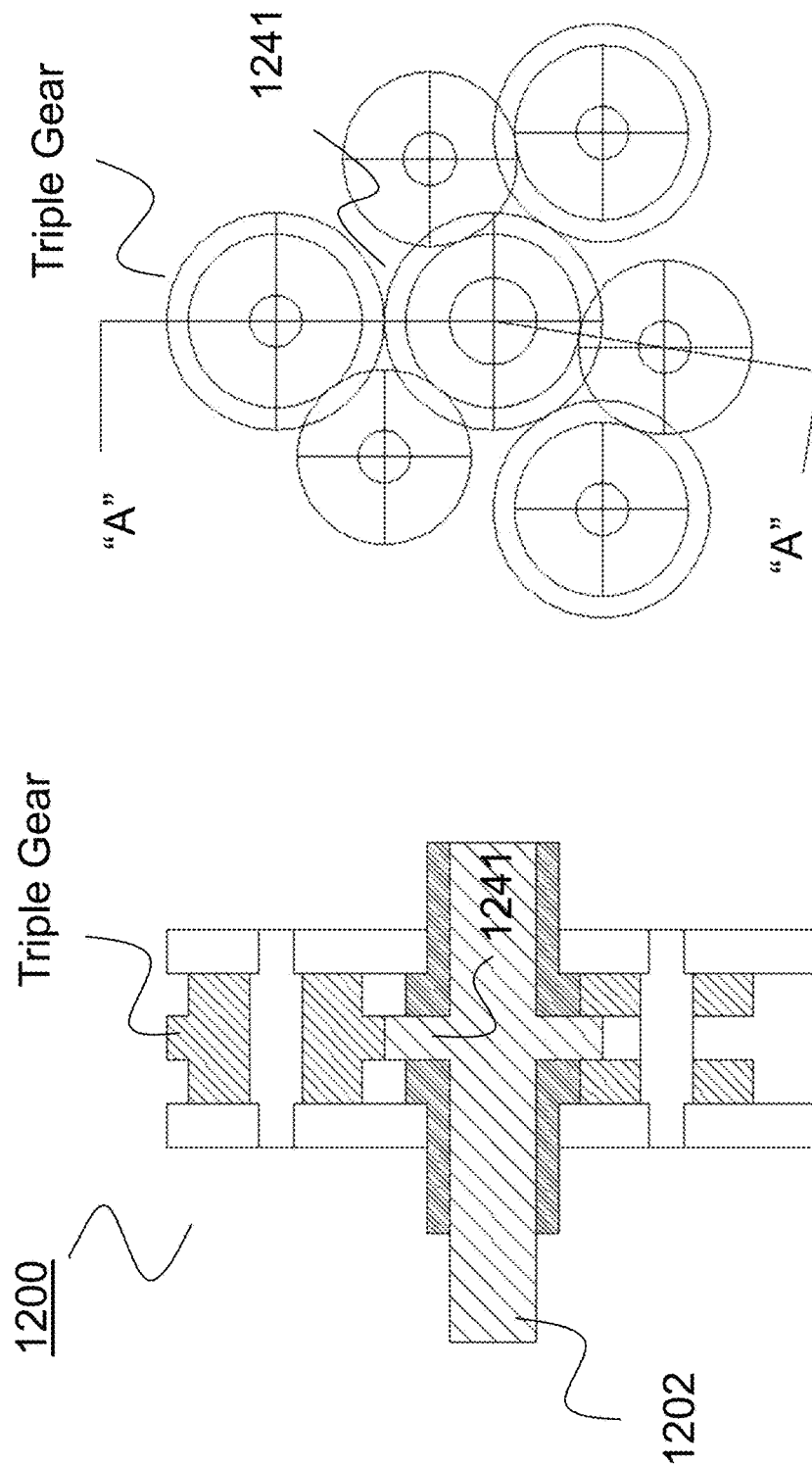
Figure 12(A). Section "A" - "A"
Figure 12(B). Front View

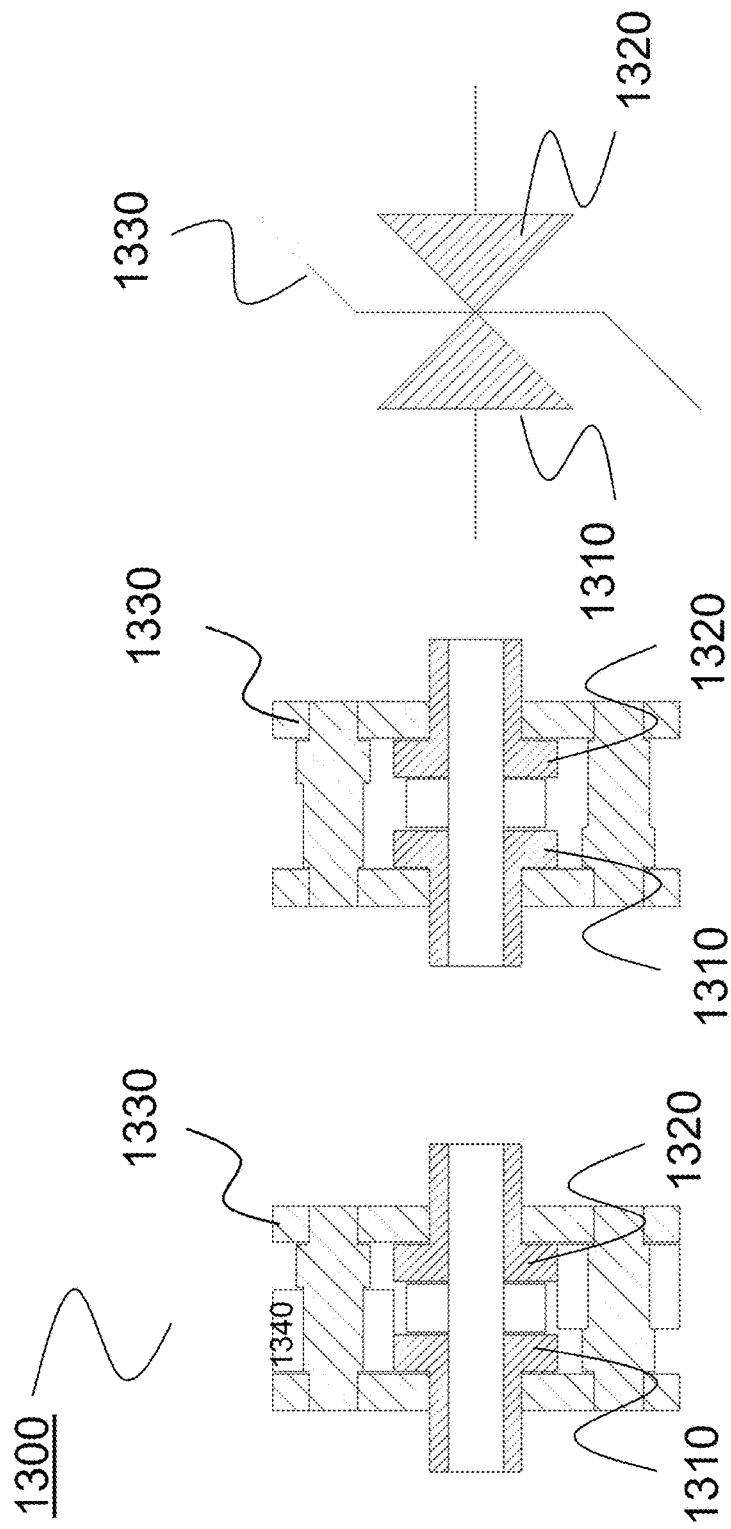

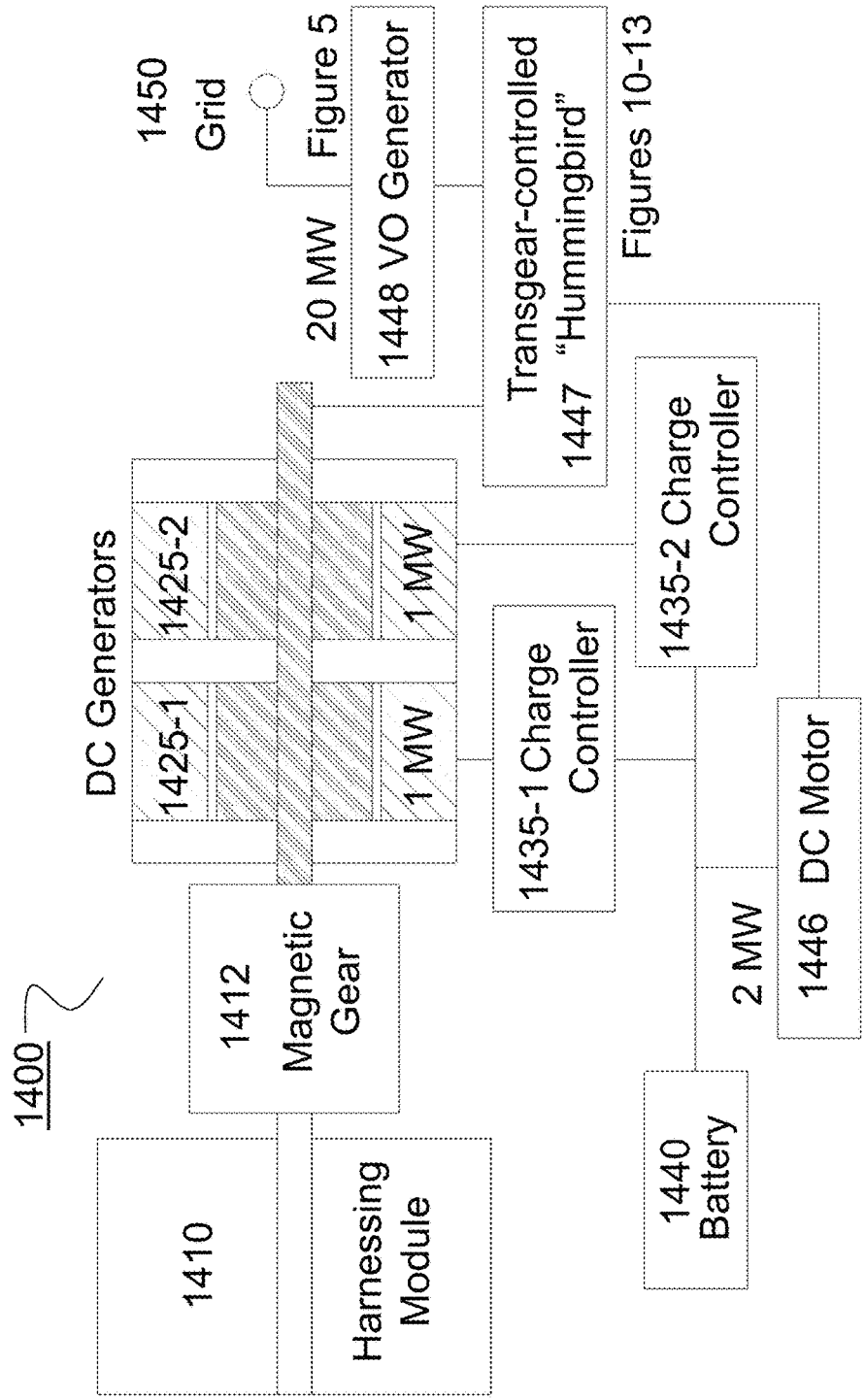
Figure 14. Control Circuit #3: Multiple Charge Controllers and a "Hummingbird"

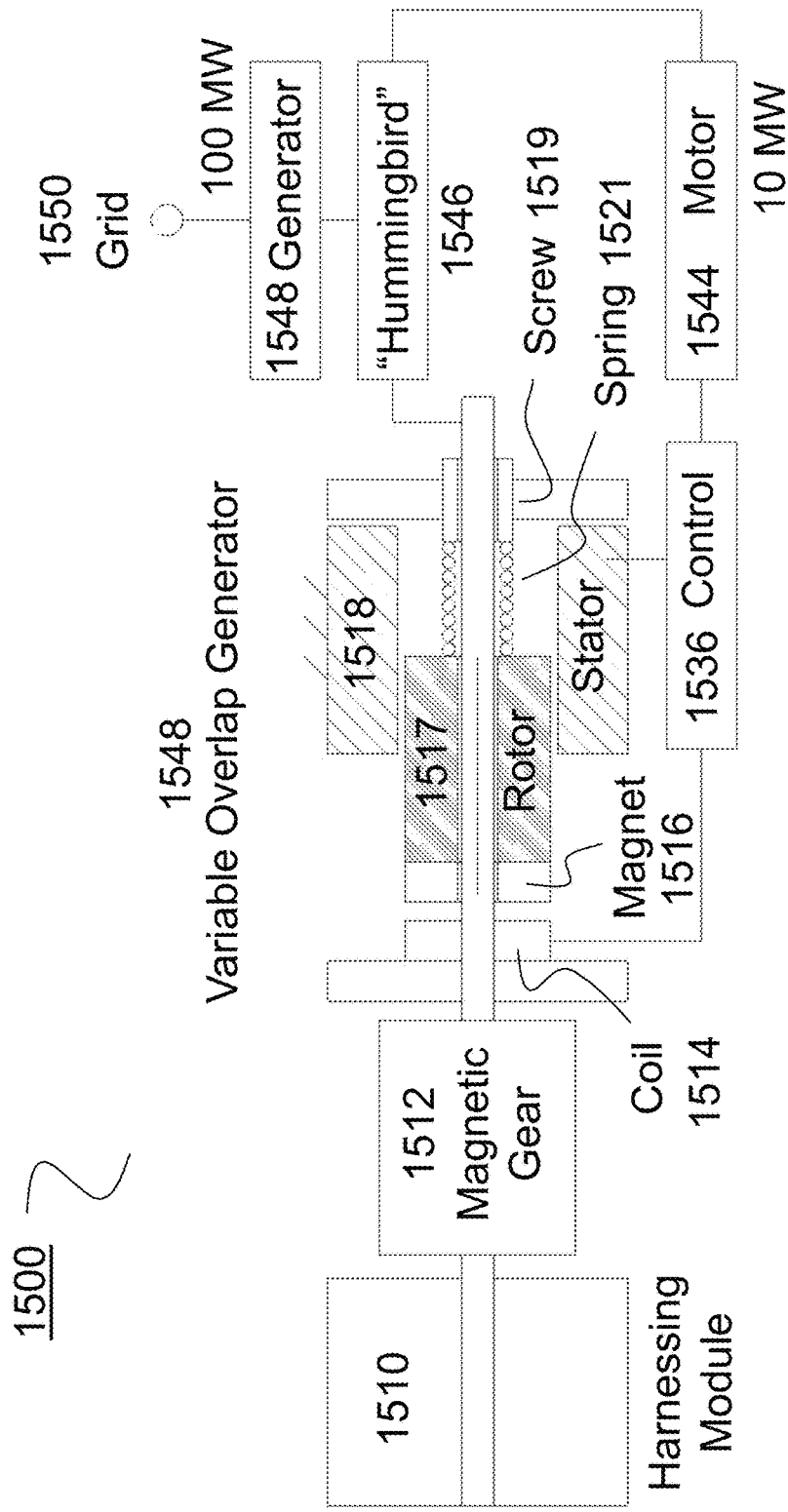
Figure 15. Control Circuit #4: a VOG as a Control and a Hummingbird

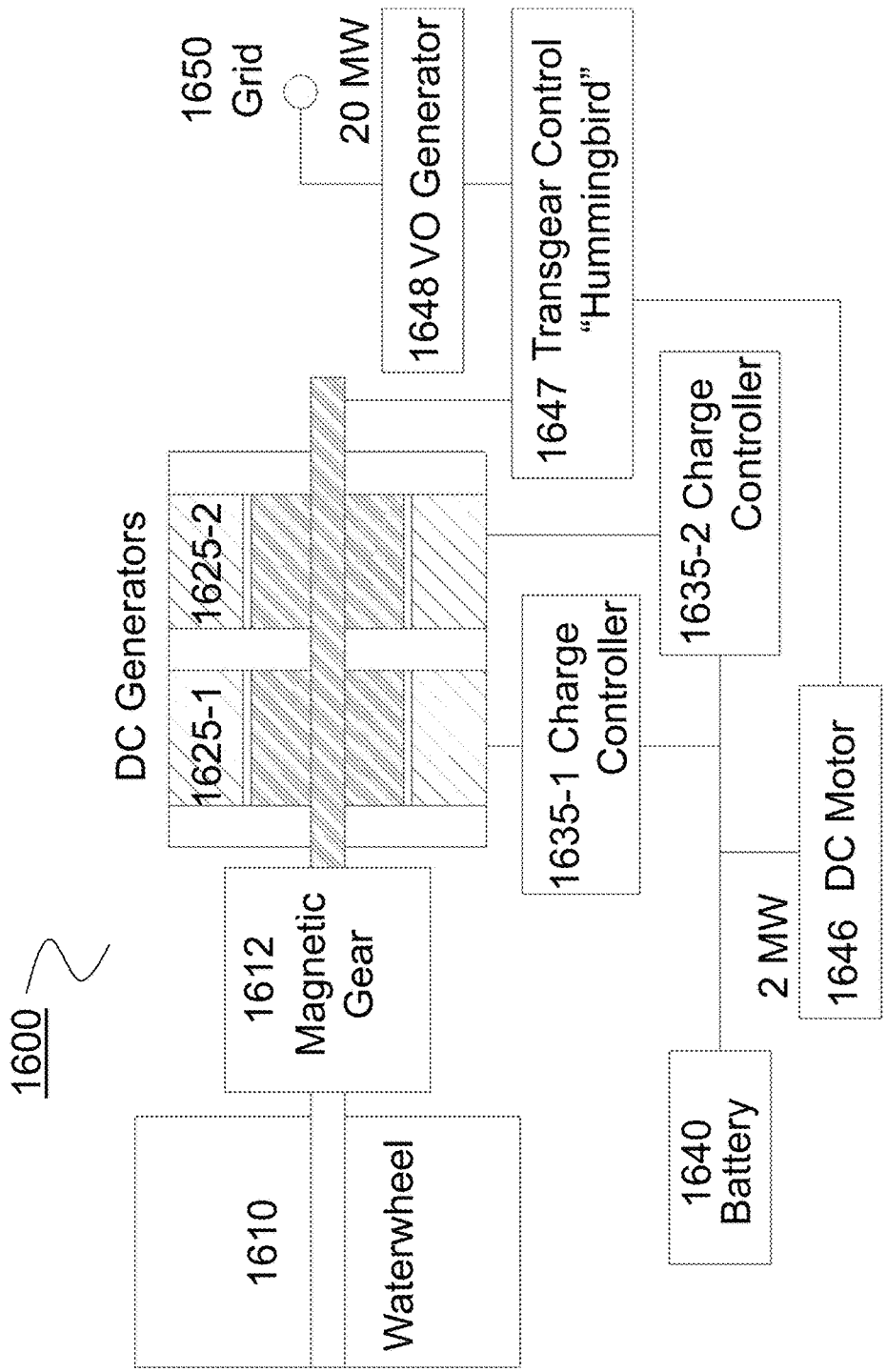
Figure 16. River and Ocean Current Turbines with Control Circuit #3

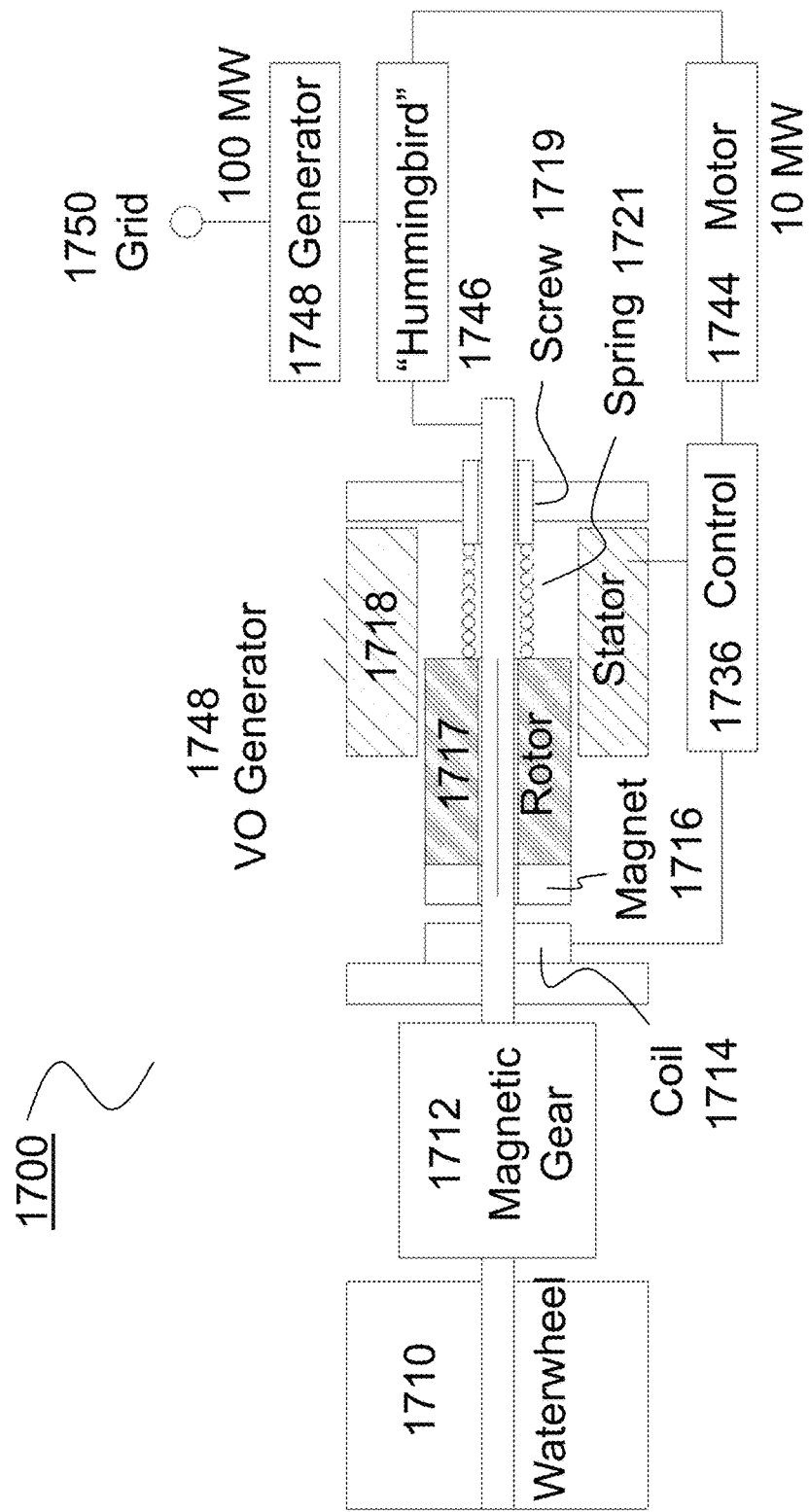
Figure 17. River and Ocean Current Turbines with Control Circuit #4

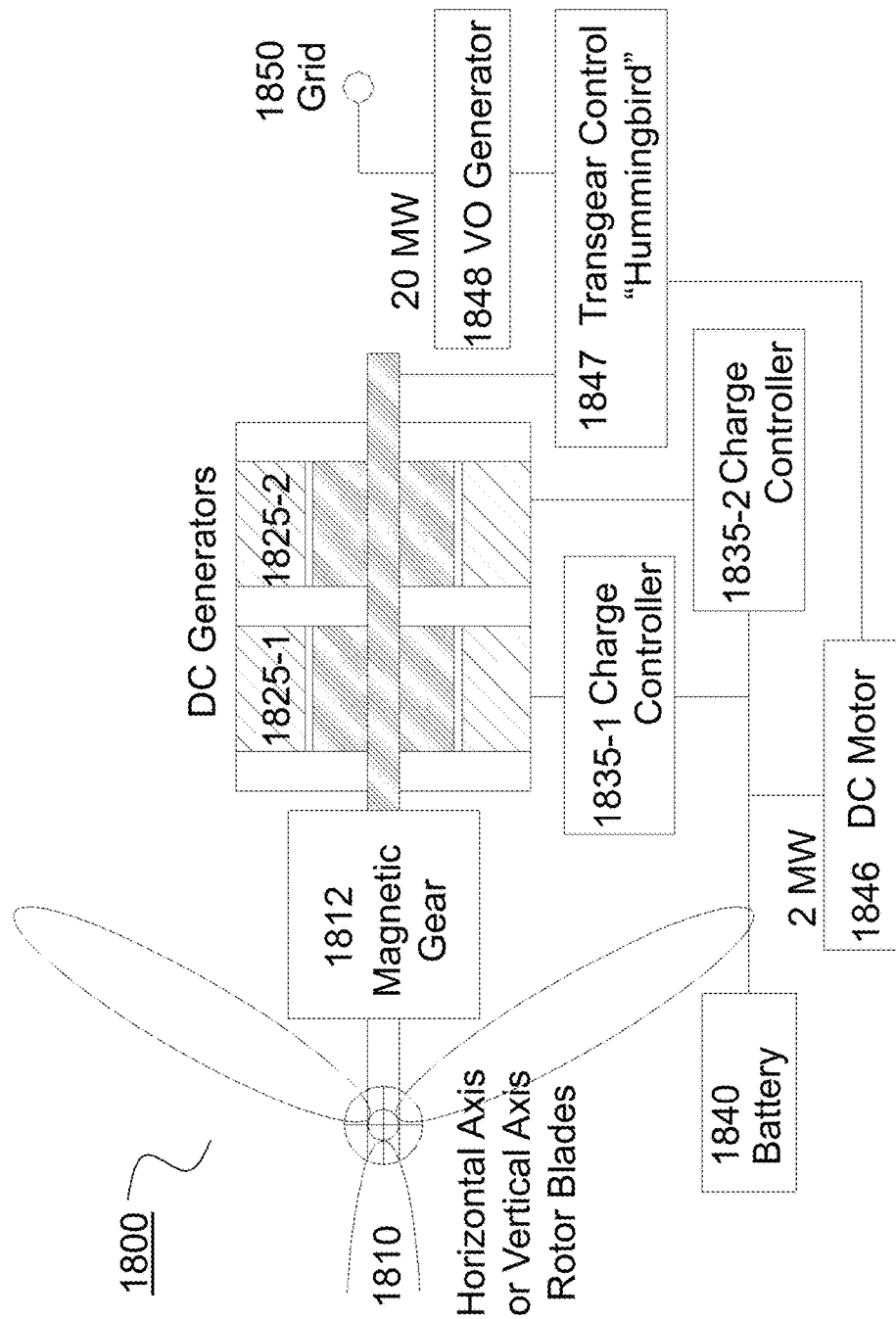
Figure 18. Wind Turbines with Control Circuit #3

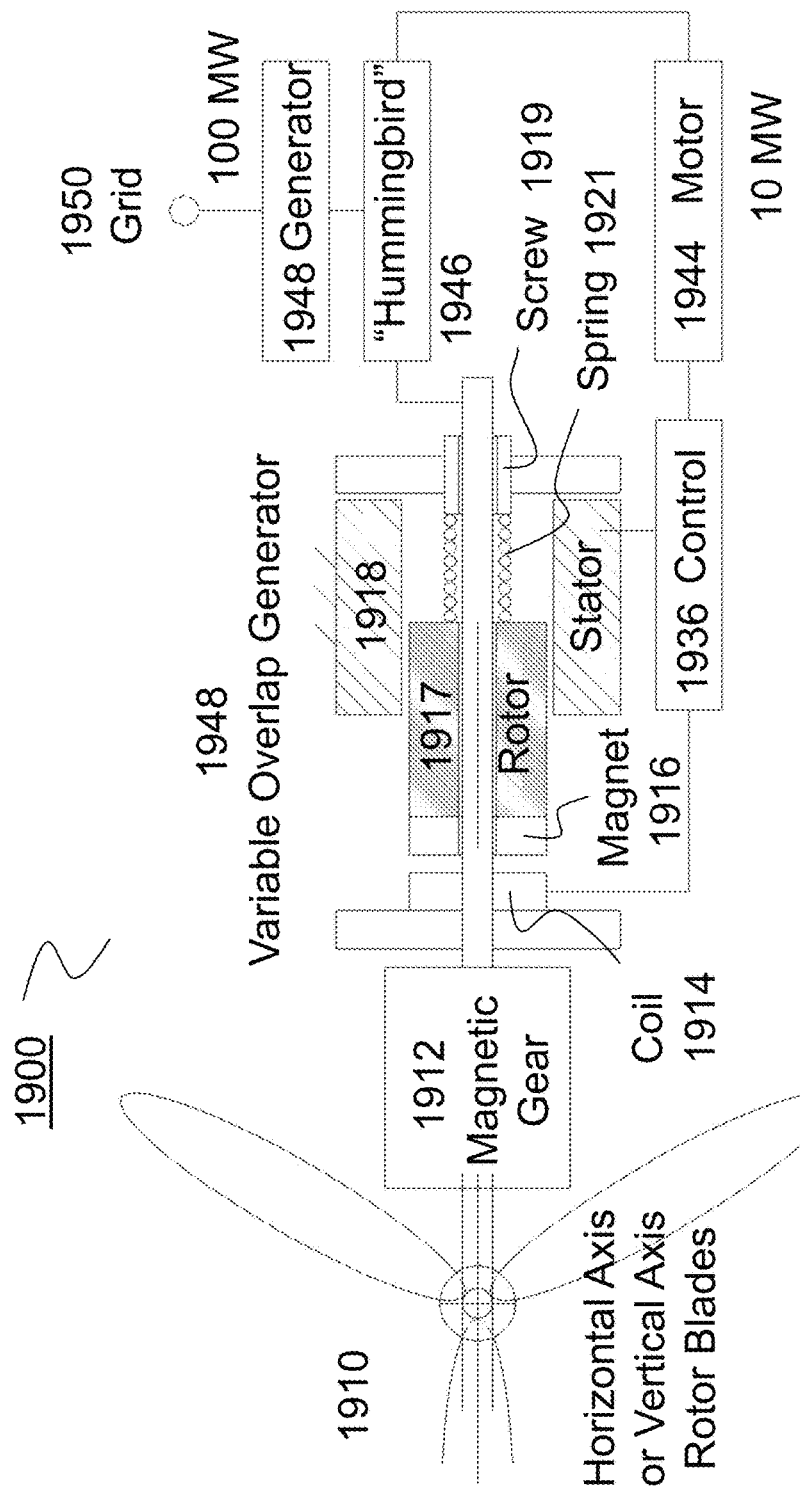
Figure 19. Wind Turbines with Control Circuit #4

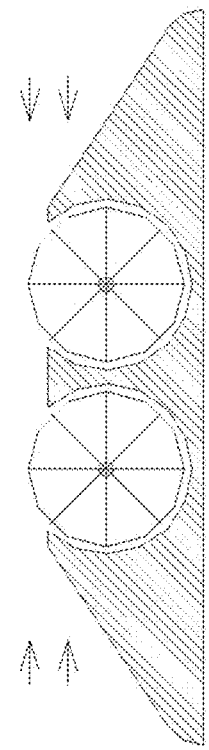
Figure 20(C) Side View
Tandem in Series
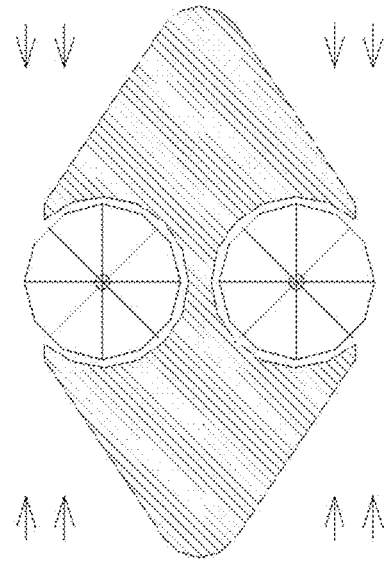
Figure 20(D) Top View
Tandem in Parallel
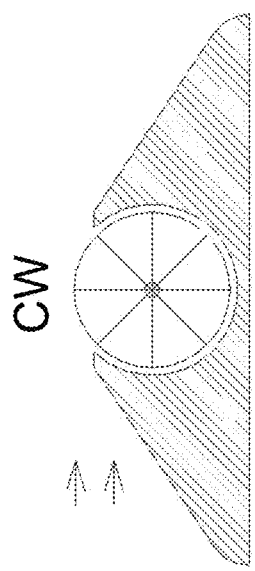
CW
Figure 20(A) Side View
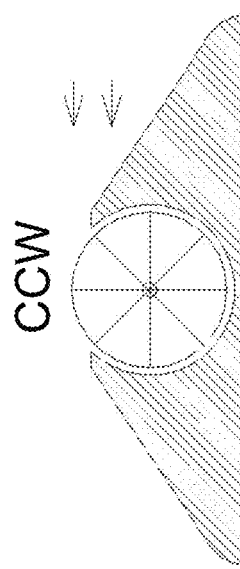
CCW
Figure 20(B) Side View

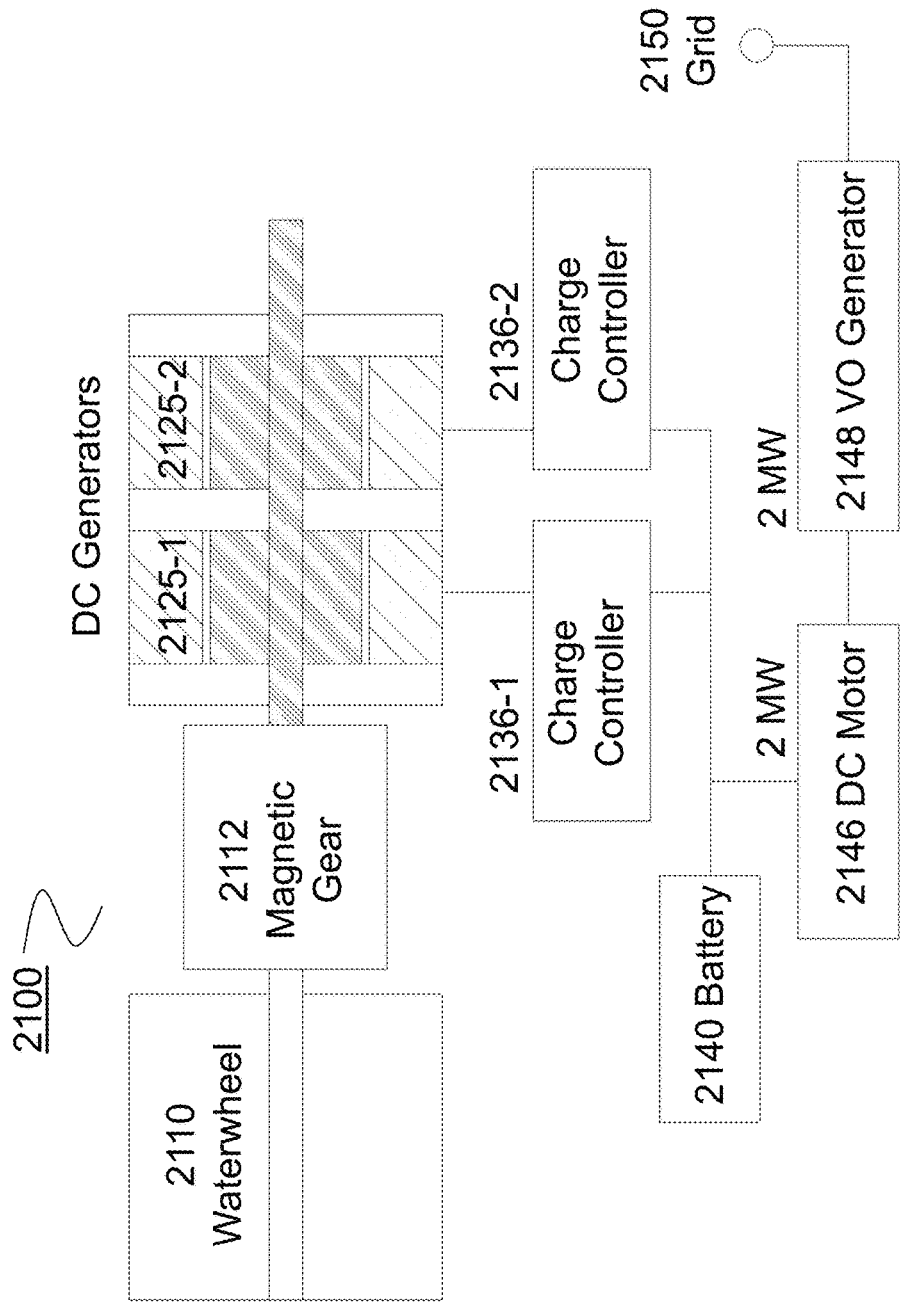
Figure 21. Tidal Turbines with Control Circuit #3

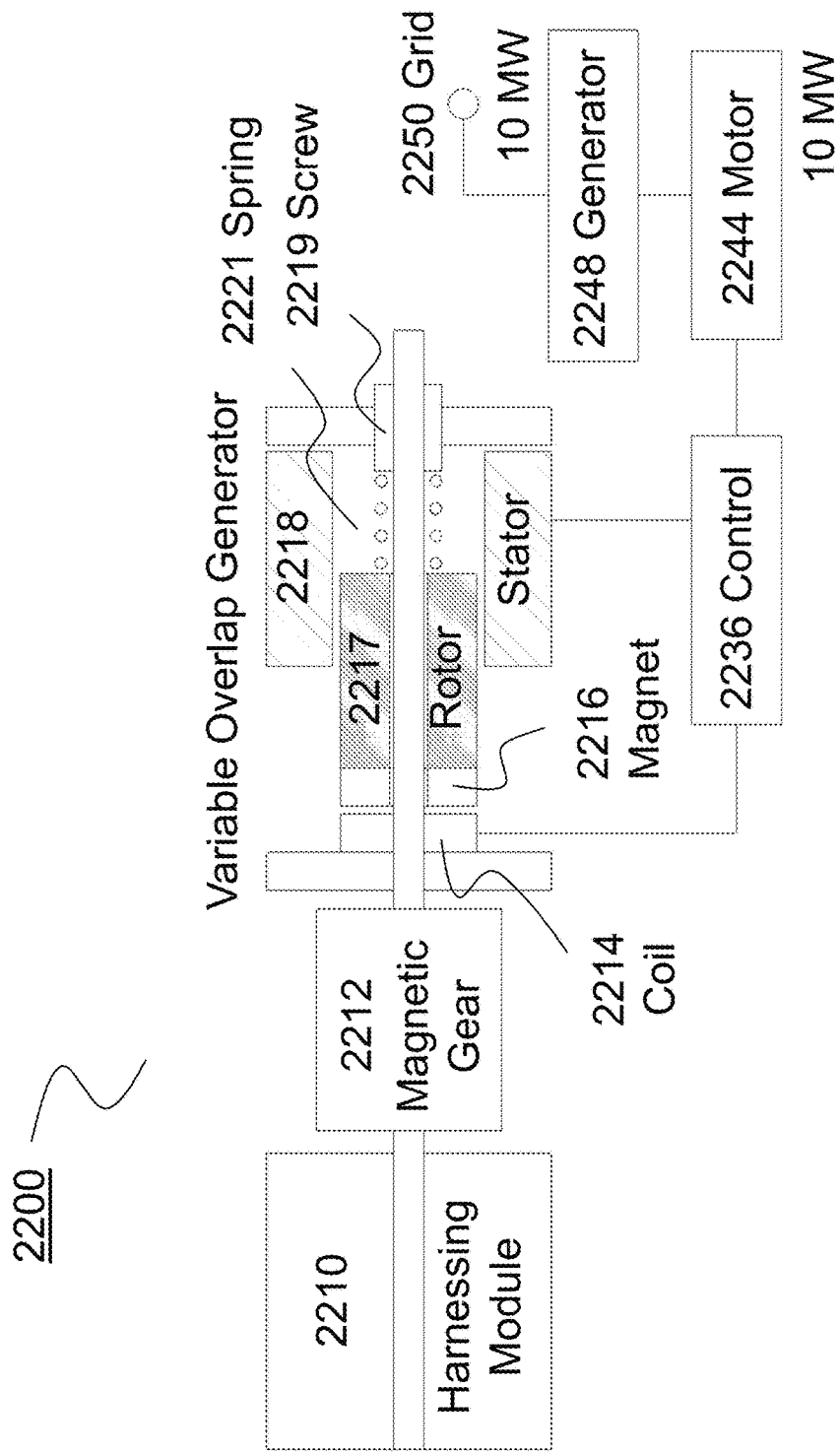
Figure 22. Tidal Turbine with Control Circuit #4

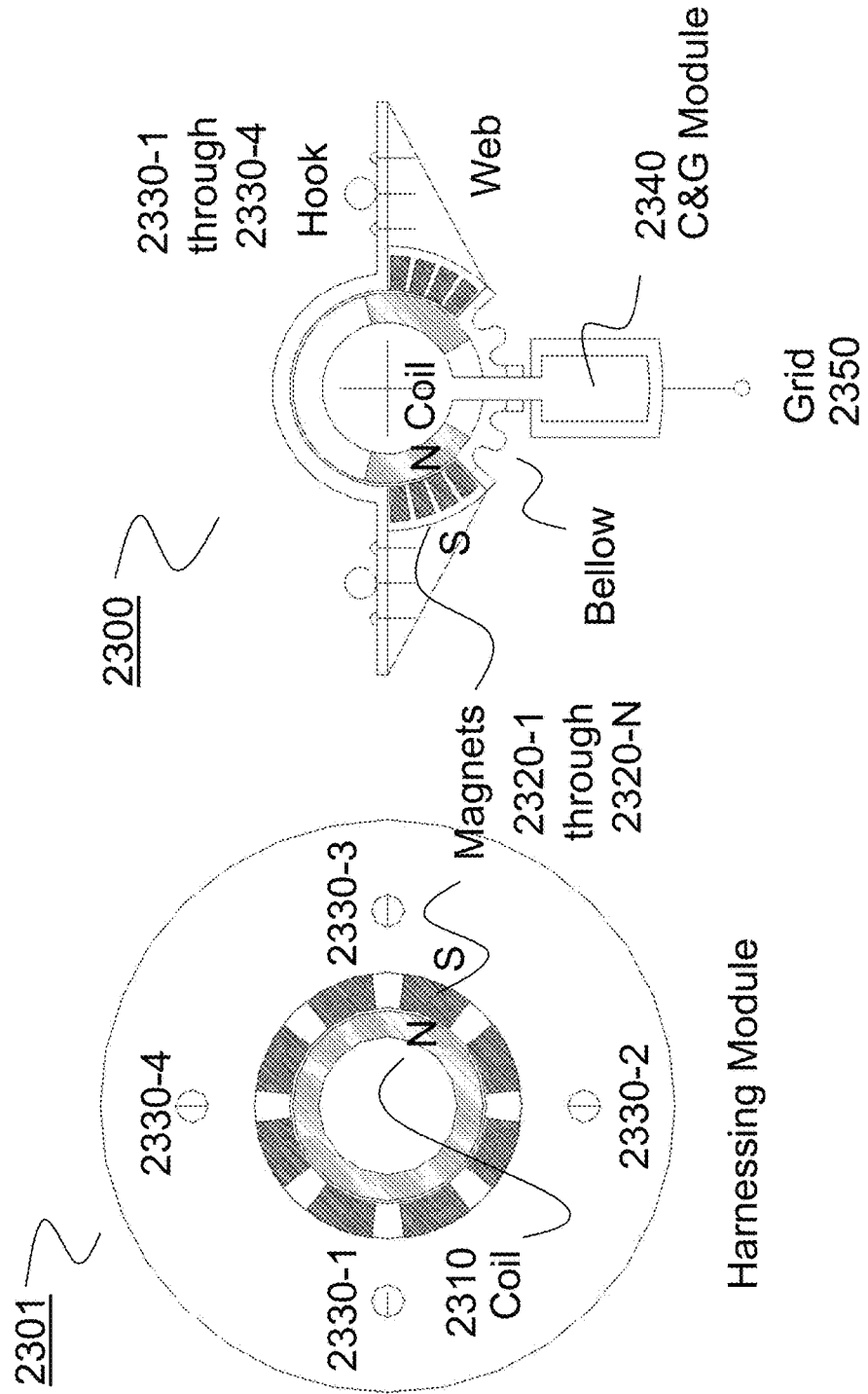

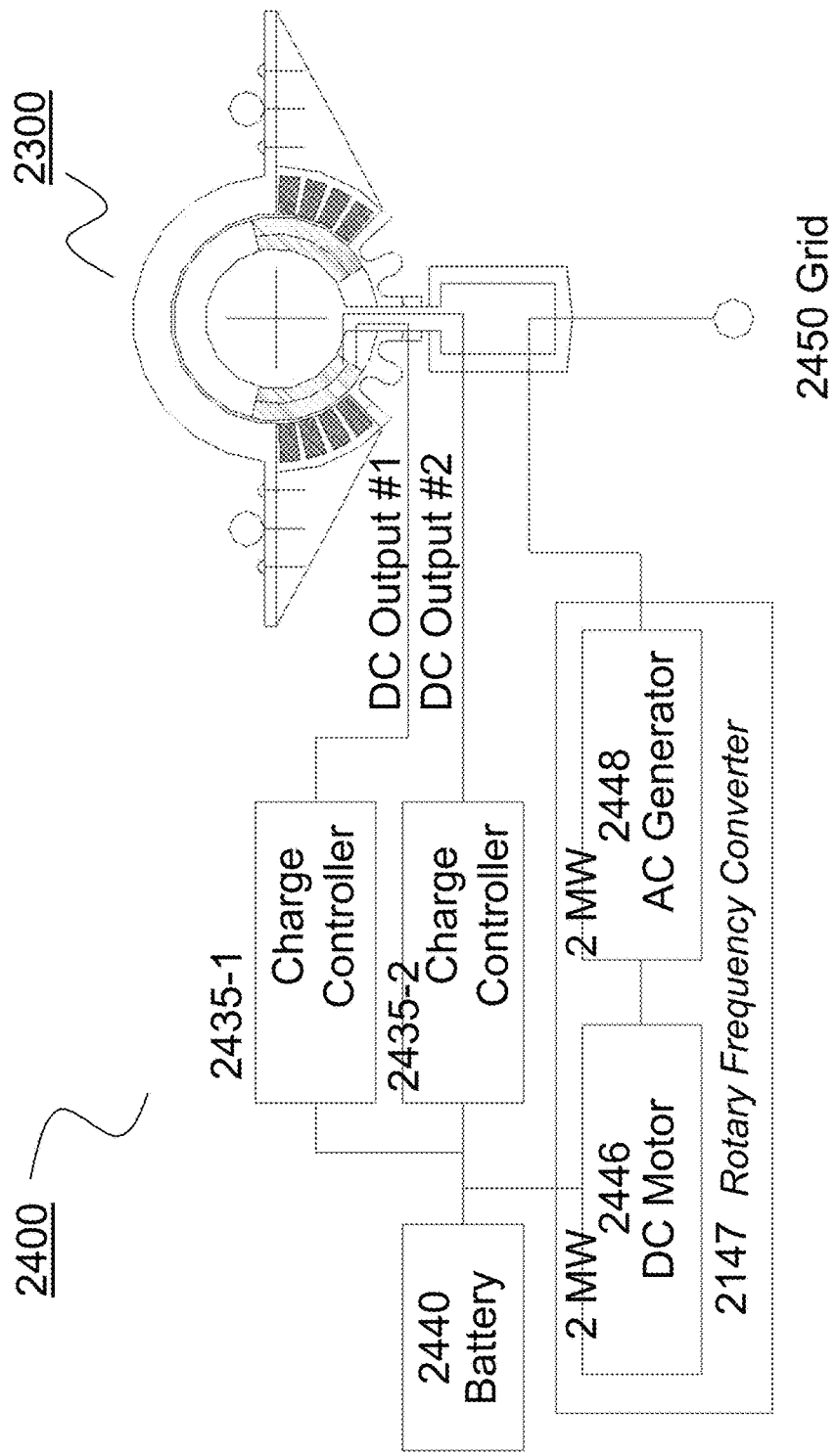
Figure 24. Ocean Wave Turbines with Control Circuit #3

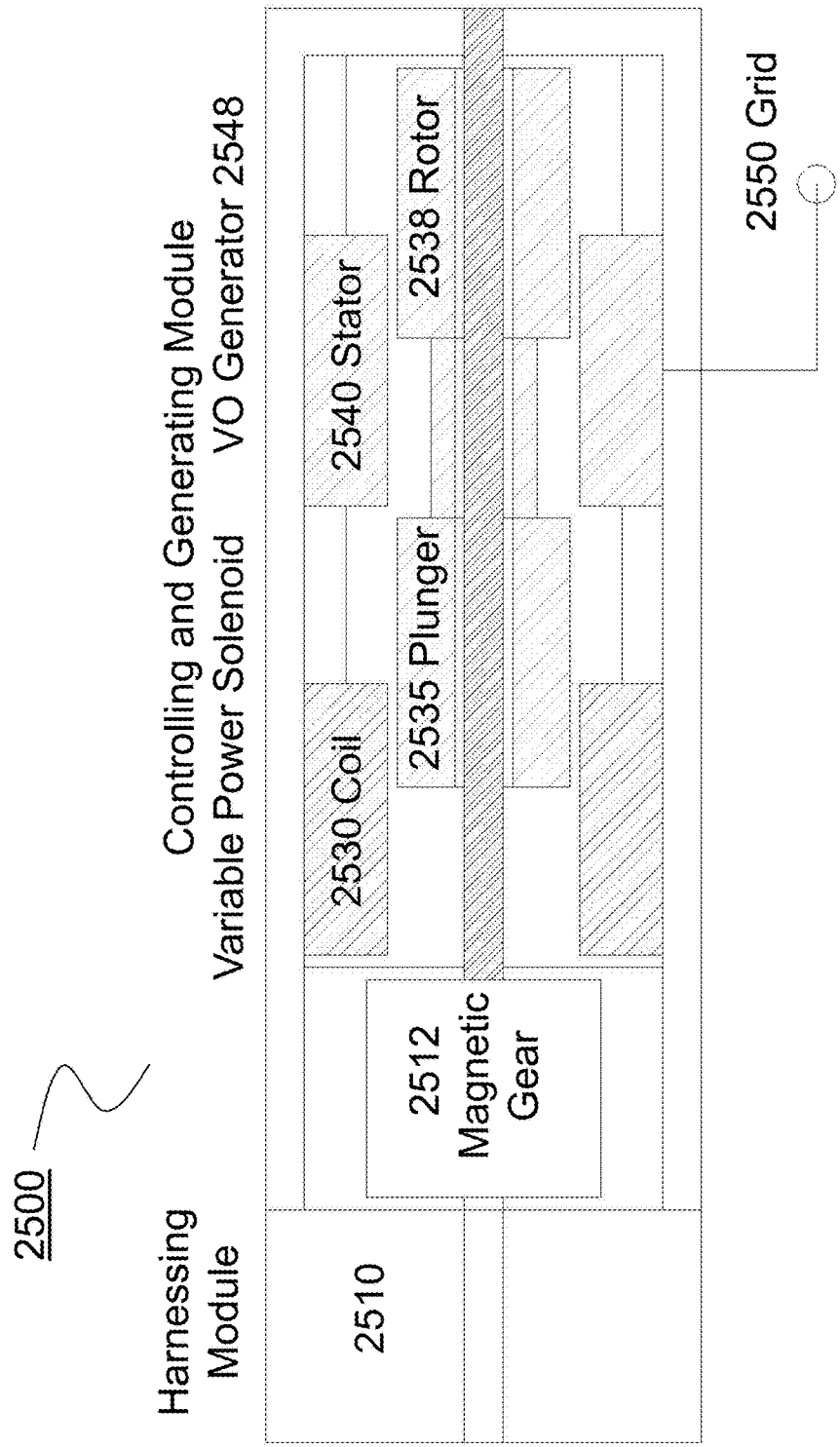
Figure 25. Control Circuit #5: Solenoid-controlled VO Generator

COMMUTATOR-LESS AND BRUSH-LESS DIRECT CURRENT GENERATOR AND APPLICATIONS FOR GENERATING POWER TO AN ELECTRIC POWER SYSTEM This application claims the right of priority to U.S. Provisional Patent Application Ser. No. 62/409,549 filed Oct. 18, 2016 of the same title and inventor and is a continuation-in-part of U.S. patent application Ser. No. 15/267,655 filed Sep. 15, 2016, which is a continuation-in-part of U.S. patent application Ser. No. 14/838,867, filed on Aug. 28, 2015, (now U.S. Pat. No. 9,476,401 issued Oct. 25, 2016) which is a continuation-in-part of U.S. patent application Ser. No. 14/829,354, filed Aug. 18, 2015, (now U.S. Pat. No. 9,490,736 issued Nov. 8, 2016), which claims the benefit of priority to U.S. Provisional Patent Application Ser. No. 62/039,096 filed Aug. 19, 2014 and U.S. patent application Ser. No. 14/829,354 is a continuation-in-part of U.S. patent application Ser. No. 14/255,377 filed Apr. 17, 2014 (now U.S. Pat. No. 9,151,269 issued Oct. 6, 2015), which is a continuation-in-part of U.S. patent application Ser. No. 13/915,785 filed Jun. 12, 2013, (now U.S. Pat. No. 8,702,552 issued Apr. 22, 2014), which is a divisional of U.S. patent application Ser. No. 13/568,288 filed Aug. 7, 2012 (now U.S. Pat. No. 8,485,933 issued Jul. 16, 2013) which claims the benefit of priority to U.S. patent application Ser. No. 61/521,408 filed Aug. 9, 2011, and to U.S. patent application Ser. No. 61/523,846 filed Aug. 16, 2011 and U.S. application Ser. No. 13/568,288 filed Aug. 7, 2012 is a continuation-in-part of U.S. patent application Ser. No. 13/425,501, filed on Mar. 21, 2012, (now U.S. Pat. No. 8,641,570 issued Feb. 4, 2014) which is a continuation-in-part of U.S. patent application Ser. No. 13/384,621, entitled "Apparatus and Method for Providing a Constant Output from a Variable Flow Input" filed Jan. 18, 2012, (now U.S. Pat. No. 8,388,481 issued Mar. 5, 2013), being a national stage entry application of PCT US 10/42519 having an international filing date of Jul. 20, 2010, all applications of Kyung Soo Han and being incorporated herein by reference as to their entire contents.

TECHNICAL FIELD

The technical field of the invention relates to providing a commutator-less and brush-less direct current generator for, in particular, the harnessing of renewable energy to output alternating current, for example, for delivering generated current at constant frequency and voltage to an electric power system such as an electric grid or an electrical load. The direct current generator should generate power with high efficiency and low maintenance since there are no brushes to wear out and or commutators to become overheated and short. The direct current generator system may utilize a mechanical rotary speed converter and a variable overlap generator (increasing or decreasing torque and power to match light or heavy wind or slow or fast river speed conditions), for example, to control output power frequency and voltage at a constant level.

BACKGROUND OF THE INVENTION

Hydroelectric and wind energy are two major sources of so-called renewable energy. In the U.S.A. in 2015 (EIA), 33.3% or one-third of all electric energy is produced by steam generation using coal. A third source of renewable energy comes from the sun (only 0.6%) and a first source comes from water (hydro amounts to 6.0% according to the EIA). Water flows at variable speed and so does wind. An advantage of water flow is the mass/density, inertia or power that may be generated by the flow of water compared with the flow of wind (wind amounts to 4.7%) where wind must be collected by large wind-driven propellers or rotor blades.

Consequently, the hope of electrical energy generation for the future is in so-called renewables which include, but are not limited to, the air (wind power), the sun (solar power) and water (hydroelectric and marine hydrokinetic, MHK, energy) sources. Nevertheless, there remains a need for a wind or water driven electricity generator that may save the cost of building a dam or a large wind mill with giant propellers, permit the marine hydrokinetic (MHK) generation of electricity and use the high inertia flow of a river or the flow of ocean currents, tides and waves. Similarly, wind-driven turbines should be more efficient, reliable, and designed to convert variable wind speed over a greater speed range to constant frequency and voltage output for delivery to an electric power grid.

Further detail of a conventional wind turbine is described in WO 1992/14298 published Aug. 20, 1992 and assigned to U.S. Windpower, Inc. A variable speed rotor may turn a gearbox to increase the rotational velocity output of the rotor and blade assembly. Typically, wind speeds over 3 meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines do not have sufficient wind speed to operate at all depending on weather conditions, placement and the like. A problem with known systems is that there is a collection of energy at variable input (variable alternating current). The variable alternating current is typically converted to direct current and then the direct current is converted to constant AC voltage and frequency alternating current. Such systems are seen by way of example in FIG. 1A (prior art).

Michael Faraday (1791-1867) is credited with the formulation of Faraday's law and at least the construction of one of the first, if not the first, direct current generator. Faraday's law may be simply stated as follows: an electromotive force may be generated in an electrical conductor (such as a copper wire or coil of wire) which encircles or is encircled by a magnetic flux, for example, caused by the presence of a permanent magnet proximate the coil or coils. Many renewable energy efforts such as the wind turbine discussed above attempt to harvest natural sources of mechanical energy (wind, tides, waves, water flow and so on) to produce electricity. Because these sources fluctuate in power such as wind energy applied, standard generators using permanent magnets and fixed windings may deliver unregulated voltage and frequency, for example, as seen by a requirement in known wind energy systems to generate DC from variable AC and then recreate a constant AC voltage and frequency from the converted DC.

New direct current generator designs such as the synchronous or induction singly-fed generator, the doubly fed generator or the brushless wound-rotor doubly fed generator are seeing success in variable speed, constant frequency applications, such as wind and other renewable energy technologies. However, such systems are complicated and are prone to failure even though they show gains in efficiency over a brush-less, commutator-free system. Consequently, problems related to known wind and water turbines relate closely to the failure rate of gearboxes, generators, variable frequency converters or variable power converters and associated electronics and inefficiencies of operation.

A solution to the identified problems is to provide a constant rotational velocity as an input to the constant speed electric generator so that the generator in turn can produce a constant frequency output and deliver a constant voltage and variable current directly to an electric grid; (a transformer may be needed). But such a solution, to the knowledge of the inventor, has not been successfully demonstrated.

A recent development in the art of gearboxes is a magnetic gear which relies on permanent magnets and avoids meshed gears. Magnetic gears, for example, developed by and available from Magnomatics, Sheffield, UK, have an air gap between sheath and shaft and so there is no meshing of gears in a mechanical gearbox to change the gear ratio of, for example, propeller or rotor input shaft to match a desired rotational velocity of an alternating current generator, for example, related to 50 Hz European or 60 Hz US. Alternating north and south poled permanent magnets are spaced side-by-side radially around a shaft and mesh with a similarly constructed magnetic gear when the permanent magnets are proximate one another. Magnetic gear sets are intended to slip with a gust of wind or burst of water energy in a magnetic gear system and then stabilize at the higher wind or water velocity. These same gears if mechanical may break gear teeth of a meshed mechanical gear gearbox.

Many of the problems of wind turbines are carried forward into marine hydrokinetic (MHK) turbines such as run-of-the-river, tidal, ocean wave and hydrokinetic river turbines. There is the same problem of having to convert a harnessed variable speed/frequency to a constant frequency and voltage output. On the other hand, for example, there are many advantages for harnessing marine hydrokinetic (MHK) energy compared with wind renewable energy: the density (mass or inertia) of water is much greater than that of wind and its speed is not as variable as wind speed especially when used in a relatively constant flowing river or stream or current which flows continuously in the same direction (such as the Mississippi River of the United States). Generally, for example, rivers flow in one direction and the major ocean currents do the same. Wave generation in oceans and other large bodies of water varies in magnitude with wind and weather. Ocean shore waves and waves caused during a storm on the ocean vary and a strong undertow or tall wave can be useful for electric power generation. Tides are reversible (high tides flowing in and low tides flowing out of a tidal estuary) and associated known turbines may be limited to one direction of water flow (high or low tide).

A concept for improving wind turbines is use of a direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, for example, use power converters or frequency converters and so result in reduced down time for gearbox repairs at the expense of increased cost due to the bigger generators. A speed converter to convert variable speed to constant speed is disclosed in priority U.S. Pat. No. 8,388,481 of Kyung Soo Han. The speed converter is entirely mechanical and so scalable and improves upon the high failure rate, reliability and efficiency of known electrical/mechanical systems. Speed converters under development are also frequency converters and are shown in this and other priority patent applications and are referred to as infinitely variable speed converters or simply speed converters. The Hummingbird mechanical rotary frequency converter described in this and a priority application is a preferred speed converter to constant frequency.

Devices are also known for harnessing the power in water waves such as ocean waves. Such a device is known and available from Pelamis Wave Power. FIG. 1 of Pelamis's U.S. Pub. Patent Application 2013/0239562 of Sep. 19, 2013 shows a Pelamis device 10 floating in the ocean. The device 10 may comprise a plurality of hinged sections 12-A, 12-B, 12-C, 12-D and 12E. The device wiggles and generates power in the direction of a wave from left to right. As the wave passes through the hinged sections, the sections 12A through 12E move up and down with the height of the wave. The wave thus creates movement which may be used to generate electricity. It may be said that the higher the wave, the greater the movement; the calmer the seas, the less the movement and the less generation of electricity.

A variable torque generator (VTG) (called a VPG when varying power output) has been described in priority U.S. Pat. Nos. 8,338,481; 8,485,933; and 8,702,552 as well as priority PCT/US2010/042519 published as WO2011/011358. The variable torque generator has one of an axially moveable rotor and/or stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another. When used in a power generator to regulate flow of power, the VTG is referred to as a variable power generator or VPG. When used in a torque generator and a power generator to regulate torque and flow of power, the generator is referred to as a variable torque and power generator or VT&PG. Torque and/or power are at a maximum when there is a maximum rotor/stator overlap. In this application, such a device is referred to as a variable overlap generator or VO generator (or VOG).

There remains a need in the art to provide a direct current generator that develops direct current solely using electromotive force (EMF) without commutators and brushes. Such a direct current generator assembly may generate electrical energy/power (via a variable overlap generator and Hummingbird speed converter) and such an efficient direct current generator from renewable sources such as wind and river/tide/ocean wave/ocean current, that is, a marine hydrokinetic or wind turbine electric power generator among other possible applications for generating electric power at constant alternating current frequency and voltage for an electric power grid for a small community (for example, in developing countries) or small industrial plant (for example, 25 kw capacity) or for powering the entire Mississippi river basin (several MHK turbines placed periodically along the length of the entire Mississippi river).

SUMMARY OF THE PREFERRED EMBODIMENTS

Embodiments of a totally electromotive force (EMF) direct current generator and a totally EMF alternating current generator are described associated with wind and river/tide/ocean wave/ocean current, marine hydrokinetic (MHK) turbine equipment, or other applications may further comprise Hummingbird speed converters and variable overlap generators (VO generators (VOG's)), wherein there may be an adjustment of the relative axial overlap between the rotor and stator to control speed, torque, and power independently and generate renewable alternating current power. A suggested application is in the potential application of a variable overlap generator and a controlled direct current generator or parallel combination of such direct current generators in wind and river/tidal/ocean wave/ocean current (MHK) turbines. First, second and third samples of improved generators have been described in Kyung Soo Han's prior patent applications. The present application is intended to describe a new concept for a commutator-free and brushless direct current generator and couple one or more such generators with a VO generator (VOG) and a Hummingbird speed converter among other known elements to produce a maximum of electric power at high efficiency.

In wind and MHK turbines, a speed converter is used for the purposes of adjusting the harnessed speed of the input which may be slow or fast depending on the rate of wind or river velocity with respect to a desired constant output speed (rotational velocity or electric power frequency) for generating electric power to be fed to an electric power grid. The embodiment of a variable speed converter has been constructed and three samples are considered having three variables and different "Goldfinch" and "Hummingbird" varieties of simpler and more complex forms constructed and tested. These Goldfinch and Hummingbird varieties of variable to constant frequency and voltage control all provide mechanical synchronization of variable input to constant output and mechanical and electrical control, for example, via hatch control, fine and coarse tuning control, and may use a constant speed motor, for example, operating at a multiple of 50 Hz (European) or 60 Hz (US) to generate constant voltage at constant frequency and the like. A three-variable gear assembly called a Transgear™ gear assembly has been developed over time from Goldfinch to Hummingbird and the first Hummingbird after simplification, may differ from one to two gear assemblies and have been reduced in complexity to a single assembly with few moving parts as samples have been constructed and simplified. It is important to note that since a speed converter converts variable speed to constant speed and converts variable frequency to constant frequency, DDMotion's speed converter may be called a mechanical frequency converter or a mechanical "rotary frequency converter" as is called in the industry to differentiate from an electronically controlled variable power converter or variable frequency converter (VFC) or variable frequency drive (VFD).

A further practical application of a variable overlap generator (VO generator or VOG) is to provide a reciprocating input to a fixed torque and power generator (FT&PG) or a variable torque and power generator (VT&PG) for generating electricity with a reciprocating rotor. This concept eliminates a process of converting erratic motion of ocean wave energy, for example, to a rotary motion before generating electricity and may eliminate the need for Sprags from the speed converter(s) described in the priority patent applications and patents, and reduces cost, weight, size, and potential validation time. For the purpose of increasing the harnessed speed of reciprocating input or preventing the mechanical gearbox damage due to the sudden surge of power of reciprocating input (such as wind energy which may vary significantly), using magnetic gears or electromagnetic coupling instead of toothed gears may improve the durability of a gearbox without damaging the teeth. The magnetic gears of a magnetic gearbox (having no teeth) may intentionally slip (rather than break) in the event of a strong gust of wind or a strong burst of water flow until a predetermined level of torque between magnetic gears is reached at which point the magnetic gears magnetically mesh with one another and do not slip (unless there is another strong gust of wind or strong water flow).

A further practical application of a variable overlap generator (VO generator or VOG) is as a reactive speed controller by adjusting the torque or varying the load so that the waterwheel speed may be increased or decreased in a river/tidal/ocean wave/ocean current, marine hydrokinetic (MHK) turbine. In this embodiment, the variable overlap generator may increase or decrease torque by axially moving the rotor and stator relative to each other in MHK or wind turbines (or any variable load) for control of a waterwheel (or propeller/blades) or a hatch of such a MHK turbine. In a MHK turbine, the reactive torque control may be applied to control waterwheel speed until reactive control reaches a designed maximum and then Hatch control may be used for further waterwheel speed control with respect to desired output electrical power frequency and amount of current generated. A variable overlap generator or VOG may accept rotating or reciprocating input because the input change may vary positively or negatively from a reference value from an erratic energy source, for example, and may provide reactive control because the waterwheel reacts quickly to a load (or to a brake).

An example of a totally electromotive force (EMF) solution to the generation of alternating current electric power at constant frequency and voltage from a variable speed renewable energy input or harnessing module (such as a waterwheel or propeller rotor) utilizes a variable output generator regulated by the input rotational velocity of the harnessing module. In particular, a plunger integral with or connected to a permanent magnet rotor may be moved from a minimum overlap position with respect to a stationary (fixed) solenoid coil and a variable overlap alternating current generator axially surrounding a shaft driven by the harnessing module so as to deliver constant frequency and voltage alternating current generated directly by the VOG coil and deliverable to a grid (or load). So as the rotational speed of the harnessing module increases, the overlap between the VOG coil and permanent magnet rotor increases to increase the alternating current (power) output of the renewable energy generator. This example will be discussed with reference to FIG. 25.

A direct current generator useful in all direct current embodiments for controlling generated output to a constant value of voltage and frequency is shown in various views in FIGS. 7A, 7B (rotor of permanent magnets axially surrounding a shaft and in FIGS. 23(A) and 23(B) (showing rotor and stator coupled magnetically or electromagnetically and the permanent magnets surrounding a coil shaped like a bowl without a bottom).

A so-called Hummingbird speed converter is shown in FIGS. 10(A) through 13(C) and its applications are shown in FIGS. 14 through 19. Various applications of a variable overlap generator with a Hummingbird speed converter and a DC generator are shown for any of river flow, tidal flow, wave and current flow in applications for water and propeller or rotor applications shown for wind. A very unusual and unique application is shown in FIGS. 23(A) through 24 for converting erratic wave energy to constant voltage and frequency.

Another way of using an embodiment of the present invention is by adjusting the torque, the rotational speed of the harnessing device, a waterwheel or an assembly of wind rotor blades having parameters (such as propeller pitch or using a hatch) that may be controlled. For steady flowing streams and rivers, without much flow rate variation, a constant speed output can be easily produced by compensating the input. In wind and strong tide and ocean current turbine applications, considerable more control is required due to the more extreme variation, for example, in wind velocity from practically a calm wind to a high velocity storm wind so as to not break the meshed gear gearbox at the input. This may be rectified by using a magnetic gear set comprising magnetic poles opposite one another axially on each gear of the set which will not break down.

In alternative embodiments shafts and rotors may be connected to a pump, transformer, engine, generator or other device or wind or river/tidal/ocean wave/ocean current (MHK) turbine as discussed above. Note that in an alternative embodiment a rotor may be moveable with respect to the stator or vice versa as needed to achieve minimum, medium and maximum torque and power (and any position in between). In MHK turbines, for example, the variable overlap generator (VO generator or VOG) may be used to advantage regulating output shaft rotational velocity to a constant value.

FIGS. 1(A) through 25 are provided by way of example to show the application of magnetic gears of a magnetic gearbox, an EMF direct current generator, a variable overlap generator and a Hummingbird speed converter in an MHK turbine, for example, or a wind power generator or a tidal or wave generator for controlling output speed or electric current frequency and voltage to be relatively constant via a constant speed control (Hummingbird) and for provision to an electric grid at varying current, dependent on water and wind flow speeds.

These and other embodiments will be described with respect to the drawings, a brief description of which follows. Similar reference numerals will be used to denote similar elements and the first number of a reference numeral may be used to denote where the element first appears in the drawings.

BRIEF DESCRIPTION OF THE DRAWINGS

FIG. 1(A) provides a prior art overview of conventional power conversion of variable kinetic energy (wind or water) to constant frequency electric power while FIG. 1(B) provides an overview of the present invention employing a speed conversion by a Hummingbird mechanical rotary frequency speed converter for converting variable speed to constant frequency and generating constant speed (rpm) and so comprises a constant speed generator. Note that the conversion of AC to DC and back to AC in FIG. 1(A) outputs a choppy alternating current wave (seen at bottom) while the conversion of variable speed to constant frequency power in FIG. 1(B) outputs a more sinusoidal, smooth wave of electrical energy at constant frequency.

FIG. 2 and an associated chart provide a perspective view of side-by-side three variable Transgear™ spur/helical gear assemblies, each having three variables, which in a first embodiment comprise an input left sun gear as an input variable, carrier gears provide a second variable which may comprise a control variable and a right sun gear of the second of the side-by-side gear assemblies may comprise a third variable of an output. As shown in the associated Table, there are six possible combinations of assignments of three variables to the left sun gear, the carrier gears and the right sun gear.

FIG. 3 has been shown many times in priority patent applications and shows a typical river or ocean current water flow turbine having a uni-directional water flow toward a hatch and waterwheel, the waterwheel having a shaft which may be controlled in part to constant speed by the optional hatch. There are also shown a gearbox of preferably magnetic gears and mechanical controls may be provided for turbines using Transgear™ spur/helical gear assemblies as speed converters which provide constant frequency and voltage power to an electric grid from a connected electricity generator. This river turbine has uni-directional water flow toward a hatch and waterwheel, the waterwheel having a shaft which may be controlled in part to constant speed by the optional hatch. There are also shown a gearbox of preferably magnetic gears and mechanical controls may be provided for turbines using Transgear assemblies as speed converters which provide constant frequency and voltage power to an electric grid from a connected electricity generator. This river turbine has been improved upon in later priority patent applications and the present patent application to render, for example, the hatch as an optional speed control feature.

FIG. 4 shows side-by-side Transgear spur/helical gear assemblies referred to herein as a Hummingbird speed converter. The two spur/helical gear assemblies comprise a tying assembly of gears at the top of the carrier gears joining the first spur/helical assembly to the second. In subsequent figures, this complex side-by-side pair of spur gear assemblies may be greatly simplified and is referred to as a Hummingbird mechanical rotary speed converter. FIG. 4 is an introduction to the mathematics behind a Hummingbird speed converter showing, for example, a positive change in rotational speed as +Δ rpm presented as input to a carrier for a plurality of spur gears of first and second spur/helical gear Transgear assemblies mounted side-by-side such that the central shaft input varies upward from X to X plus the positive change +Δ rpm in revolutions per minute. The input shaft shown in hatched lines transfers the upwardly variable rotational speed to the second spur gear assembly connected in parallel to the first and demonstrates development of a contrary −Δ rpm which causes the output at the Output to be the desired constant rotational speed X rpm. A further discussion of the many alternative embodiments of a Hummingbird speed converter are discussed with reference to FIGS. 10(A) through 13(C).

FIG. 5 shows an example of a variable overlap generator (VO generator or VOG) referred to in priority patent applications as a variable torque and power generator (VT&PG) where an axial overlap between a rotor and a stator may be varied between a maximum and a minimum overlap. The VO generator forms a variable torque and power generator (VT&PG), and, when there is minimum overlap of rotor and stator, the VO generator controls the output torque to be a minimum, and, when there is maximum overlap, controls the output power to be a maximum given a maximum rotational speed input to the rotor or "motor shaft" which is connected, for example, to a wind propeller or to a waterwheel.

FIGS. 6(A) through 6(C) show further detail in diagrams of, first, a fixed overlap generator or FO generator according to FIG. 6(A) which cannot vary the axial relationship of rotor to stator as is seen in FIG. 6B. FIG. 6B shows a minimum overlap of rotor and stator, for example, for conditions of low wind velocity or low water flow velocity so that some electricity may be generated and, for example, a propeller or rotor may turn at low cut-in speed. FIG. 6(C) shows a maximum overlap of rotor and stator similar to the maximum overlap shown in FIG. 6(A) which can handle maximum wind speeds and water flow and generate maximum power. It should be noted that the power rating of the VO generator is greater than that of a fixed overlap generator to harness power at the faster rated speed, i.e. a greater rated power. FIG. 6(D) comprises a table which corresponds to FIGS. 6(A) through 6(C) and describes fixed overlap generator (FOG) versus variable overlap generator (VOG) operation.

FIG. 7(A) introduces the concept of a direct current generator which shows a cross-section having a shaft at the center (coming out from the page). Tied to the shaft is a rotor comprising a plurality of permanent magnets shown having North and South polarity. While the south pole is shown closest a shaft, in alternative embodiments, the North pole may be closest the shaft. The N/S permanent magnets may form a plurality of, for example, six permanent magnets of a rotor (more than four permanent magnets up to, for example, a practical number may be used); however, any number of permanent magnets may be used and are paired with electric wire coils of a stator. A loop of coil conductor is wound in such a way that when the permanent magnets are rotating, the rotating magnets cut the coil and EMF will be produced. Direct current is generated in one step, directly. The coils provide the generated direct current according to Faraday's law except, in this case, with the same polarity rather than alternating polarities (alternating current). There are no commutators or brushes needed to wear out and the brushes will not cause the coils to short. There is no need for a rectifier bridge to smooth the direct current output. As seen in FIG. 7(B) the circuit diagram for FIG. 7(A) is shown whereby a direct current voltage (VDC) is output by the electromotive force generated by the coils. A reciprocating magnetic polarity generated as the shaft turns may develop ocean wave direct current energy as will be discussed with reference to FIGS. 23(A), 23(B) and 24 as well as be used for developing wind and water renewable energy as will be discussed with reference to FIGS. 14 through 19 and 21 through 22 where the DC generators may be applied in pairs in parallel or in parallel groups of three or more to develop more power.

FIG. 8 shows an application which may be referred to as a basic Control Circuit for providing constant frequency and voltage power from a variable speed input. The basic Control Circuit 800 comprises a harnessing module 810 (on the left) which is exemplified by a waterwheel driven by water flow or by rotor blades which may be exemplified by a wind turbine propeller. The harnessing module 810 is preferably coupled to a DC Generator 825 according to FIG. 7(A) via a set of magnetic gears (not shown) to protect the DC generator in the event of strong gusts of winds. The DC Generator 825 forms a component of a Controlling Module 820. The DC Generator 825 generates direct current in varying quantity depending on the water flow or wind velocity. As a result, a known charge controller 835 may be connected between the DC generator and a battery to protect the battery in the event of overcharging and vice versa to regulate the input of direct current so that the battery 840 may be charged. A charge controller 835 will receive a variable output of DC generator 825 (wind or water speed dependent) from the harnessing module 810. A charge controller 835 and battery 840 is especially important in a wind turbine because one does not want batteries for storing direct current voltage to go dead or, on the other hand, be over-charged. A marine hydrokinetic power generator would be expected to be much more consistent in the generation of power than a wind turbine. In overcharging situations, the charge controller 825 may be associated with a load such as a heater which may be used to keep vulnerable parts of a basic rotary frequency converter from freezing. The joined output of the charge controller and battery are connected to a rotary frequency converter 845, for example, of the type first shown in FIG. 4. A generating module 830 is shown at the right of FIG. 8 and is intended to incorporate a variable overlap generator (VOG) for delivering generated wind or river power to a public electric grid 850. By way of example, a DC gear motor 846 at one megawatt at approximately constant frequency and voltage alternating current and may operate a variable overlap generator 848 also operating at the exemplary one megawatt. The variable overlap (VO) generator 848 then outputs, in this example, one megawatt of power to grid (or load) 850. Throughout the present patent application, the terms VOG, VO generator and variable overlap generator all refer to the same apparatus. In prior applications of the inventor, the VOG has also been referred to as a variable torque generator.

FIG. 9 shows an exemplary application which may be referred to as Control Circuit #2 which may generate more electricity than, for example, one megawatt. The theory behind Control Circuit #2 is that having the more separately operating charge controllers, which is a power limiting unit for the currently used power converter turbines, and for more DC generators (or added center taps to a stator coil), the greater the electricity output. A magnetic gear set 912 is shown between the harnessing module 910 and a pair of DC generators 925-1 and 925-2, preferably similar to the DC generator of FIG. 7(A). It is suggested that twice the generating capability of an exemplary one megawatt will be output from the DC generators. Each DC generator will feed its, exemplary, one megawatt to a first charge controller 935-1 and a second charge controller 935-2 which regulate power to battery 940. As in FIG. 8, the output, now doubled to two megawatts is provided to a DC gear motor 946 and then to a variable output alternating current generator which regulates to constant frequency alternating current which is then fed to grid (or load) 950. The same concept may be applied to the currently used turbines with power converters.

FIG. 10(A) provides a schematic (developed by DDMotion) of a renewable energy generator comprising the mechanical rotary frequency converter for providing a three variable mechanical control, Hummingbird, using symbols for input, output and control variables as first shown in FIG. 4. FIGS. 10(B) through 10(G) show one sequence of steps of simplification of side-by-side, two Transgear spur/helical gear assemblies such as seen in FIG. 10(B) to a thin, simple, and efficient control gear assembly having a common sun gear in the middle of the shaft 1041 in FIG. 10(G), both the shaft and sun gear shown in cross-hatching.

FIGS. 11(A) and 11(B), first shown in FIG. 10(G), show a simplified mechanical rotary frequency converter (or simplified Hummingbird) comprising a three variable control, Hummingbird, in section A-A view (FIG. 11(A)) and front view (FIG. 11(B)) respectively having a Long Gear at top where FIG. 11(B) shows three sets of two planetary gears equally spaced about the shaft 1102 for meshing with three sun gears, left, middle, and center, with sleeves centered around a central input shaft, middle sun gear 1141 connected to input shaft 1102 with a larger attached or integral input sun gear 1141.

FIG. 12(A) and FIG. 12(B) show a further, second variation of a simplified Hummingbird three variable control 1200 along section A-A (FIG. 12(A)) utilizing a different type of planetary gear (Triple Gear shown at top), three different equally spaced, and different diameter planetary gear sets as best seen in FIG. 12(B) where a first set of planetary gears shown in FIGS. 12(A) and 12(B) as Triple Gears with different diameters at left, wider at center and right and a second set of planetary gears shown in FIG.

12(B) both being one gear thick. Note the extension of shaft, sun gear 1241 to, for example, waterwheel input shaft 1202.

FIG. 13(A) shows a Transgear spur/helical gear assembly comprising a basic three variable spur/helical gear Transgear gear assembly 1300 with first and second sun gears 1310, 1320 and a carrier 1330 (planetary gear 1340 also shown about an un-numbered pin part of the carrier 1330) while FIG. 13(B) shows an assembly of FIG. 13(A) emphasizing the three variables only, two sun gears 1310, 1320 and a carrier 1330, while FIG. 13(C) represents a symbol for a Transgear gear assembly having a control, an input and an output which may comprise the three leads 1310 (input), 1320 (output), 1330 (zig-zag control) to the depicted symbol used herein as a shortcut means to display a Hummingbird mechanical rotary speed converter.

FIG. 14 is a block diagram of a Control Circuit #3 (comprising a mechanical rotary frequency converter or Hummingbird 1446) being a layout of a two Transgear assembly (FIG. 10(B) and comprises a harnessing module 1410, a magnetic gear set 1412 to protect against high wind velocity or strong water flow, first direct current generator 1425-1 and second direct current generator 1425-2 each producing, for example, one megawatt to respective first charge controller 1435-1 and second charge controller 1435-2 to regulate charging of battery 1440 for providing, for example, two megawatts of direct current to the mechanical rotary frequency converter comprising a direct current gear motor or motor 1446 output to Hummingbird 1447 and also the magnet gear out shaft to Hummingbird 1447 to variable output generator 1448 generating a multiple of two megawatts, such as twenty megawatts, of alternating current to grid (or load) 1450. The increase of two megawatts to, for example, twenty megawatts is based on a test sample result but the exact ratio between input and output may be greater (or less) and will be further investigated.

FIG. 15 is a block diagram of a Control Circuit #4 which may generate as much power is needed for a particular application. Harnessing module 1510 may be used to harness renewable wind and water energy sources and magnetic gear set 1512 may protect an input shaft from a mechanical breakage of gear teeth. A variable overlap generator 1548 is shown in more detail showing, for example, the rotor 1517 displaced from the stator 1518 and having a coil 1410 for variably pushing against a magnet 1516 (to move from minimum to maximum overlap), an electronic control circuit 1536 connected to a harnessing module rotational speed sensor (not shown) and a spring 1521 and a compression adjustment screw (or other known adjustment device) 1519 for controlling the displacement of the rotor 1517 from the stator 1518 (attached to the housing) during varying conditions of velocity of wind and water. The output of the electronic control circuit 1536 is provided to a, for example, ten mega-watt direct current motor 1544 for output to a Hummingbird mechanical rotary speed converter 1546 for outputting a constant speed to alternating current generator 1548. If wind and water are flowing fast enough, the VO generator 1548, control circuit 1536 and motor 1544 will work together with a Hummingbird mechanical rotary speed converter to provide a constant large output power via alternating current generator 1548 such as one hundred megawatts to grid (or load) 1550. The variable overlap generator 1548 may be regulated between minimum and maximum overlap to provide whatever output may be desired given a constant output motor 1544 producing, for example, ten megawatts.

FIG. 16 depicts a first block diagram of a control circuit #3 developed especially for use with river or ocean currents (unidirectional current flow) using, for example, two direct current generator assemblies 1625-1 and 1625-2 side-by-side where the central waterwheel shaft comprises the input to a buffering magnetic gear set in the event of storm water flow, the output of the DC generators being provided respectively as discussed before to respective charge controllers 1635-1 and 1635-2, the charge controllers regulating the amount of charge to direct current battery 1640 which output is provided to a direct current gear motor 1646 and from the motor 1646 to a Hummingbird Transgear speed control assembly 1647. Hummingbird 1647 provides a constant frequency output to variable output generator 1648 which provides alternating current power to a grid (or load) 1650.

FIG. 17 shows a block diagram of a control circuit #4 for a river or ocean current (unidirectional water flow) where a waterwheel harnessing module 1710 outputs a variable rotational velocity input to magnetic gear set 1712 which controls for storm water and then the output of the magnetic gear set 1712 is provided to a variable output generator 1748 comprising as discussed before, a rotor 1717, a stator 1718, a coil 1714, a magnet 1716, a spring 1721, a screw 1719 and a control 1736 for providing output to a DC control motor 1744, the VO generator 1748 and motor 1744 for providing input to a Hummingbird speed converter 1746 providing a constant speed output to an alternating current generator 1748 which in turn provides alternating current power to a grid (or load) 1750. If the constant direct current motor operates at, for example, ten megawatts, then, the control circuit #4 may operate at, for example, 100 megawatts.

FIG. 18 provides a block diagram of a control circuit #3 for either a horizontal or a vertical axis wind turbine, HAWT or VAWT, where more electricity is generated and the rated power of the charge controllers is increased accordingly. The harnessing module 1810 comprises a propeller or rotor coupled to a magnetic gear set 1812 to protect against heavy gusts of wind. The magnetic gear shaft is input to first and second direct current generators 1825-1 and 1825-2 and respective charge controllers 1835-1 and 1835-2 for controlling the charging of batter 1840. Battery 1840 powers DC gear control motor for input to a Hummingbird speed converter 1847 which provides a constant speed input to Hummingbird 1847. Hummingbird 1847 provides a constant input to variable output alternating current generator 1848 for outputting electricity to grid (or load) 1850.

FIG. 19 provides a block diagram of a control circuit #4 for either a horizontal or a vertical axis wind turbine, HAWT or VAWT. A harnessing module 1910 comprises a propeller or rotor coupled to a magnetic gear set 1912 to protect against heavy wind gusts. The magnetic gear set shaft is input to a variable overlap generator 1948 comprising a rotor 1917 and stator 1918 axially movable with respect to one another via coil 1914, magnet 1916, screw 1919 and spring 1921. Control 1936 connected to coil 1914 and stator 1918 outputs a constant output when compared with the variable propeller 1910 output to constant motor 1944, for example, operating at ten megawatts. Hummingbird 1946 receives an input from the shaft and from motor 1944 to deliver a constant speed input to generator 1948 which, for example, may output one hundred megawatts of electricity compared with, for example, just ten megawatts of direct current control motor 1944 to grid (or load) 1950.

FIG. 20(A) through FIG. 20(D) provide arrangements of harnessing modules for harnessing power from tidal estuaries where current is bi-directional. FIG. 20(A) shows water flow entering from the left and causing a harnessing module waterwheel to turn clockwise (CW). FIG. 20(B) shows water flow entering from the right and causing a harnessing module waterwheel to turn counter-clockwise (CCW). Using DC generators, the direction of the waterwheel rotation does not affect the DC power generated (it is not alternating current). FIG. 20(C) shows a tandem unit in series and FIG. 20(D) shows a tandem unit in parallel. Multiple waterwheels (more than two) may be provided in alternative embodiments, stacked vertically or in series as in FIG. 20(C) or otherwise designed to multiply the amount of power generated in a tidal, flow in, flow out, flow of water.

FIG. 21 provides a block turbine for a tidal turbine, a horizontal or vertical axis wind turbine (HAWT or VAWT) control circuit #2 where the reverse tidal flow also generates DC power. If the DC gear motor is, for example, at two megawatts, then, the output to the grid 2150 may be, for example, two megawatts. Waterwheel 2110 is protected by magnetic gear set 2112. A shaft output drives DC generators 2125-1 and 2125-2. More DC generators may be provided to output more power. Each DC generator output is controlled by a charge controller where charge controller #1 2135-1 in fed by DC generator #1 2125-1 and charge controller #2 is fed by DC generator #2 2125-2. The charge controllers regulate the charging and discharging of battery 2140 which outputs direct current to direct current gear motor 2146. DC gear motor 2146 outputs to mechanical rotary speed converter Hummingbird 2147 to assure a constant frequency output which is further controlled to a constant frequency and power output by variable overlap generator 2148 for outputting alternating current power to grid (or load) 2150.

FIG. 22 provides a schematic for a tidal turbine, a horizontal or vertical axis wind turbine (HAWT or VAWT) control circuit #4 where the tidal or unidirectional water flow power may be, for example, ten megawatts. If the motor 2244 is, for example, at ten megawatts, then, the output to the grid 2250 may be, for example, ten megawatts.

FIG. 23(A) provides a first view of a harnessing module 2300 for an erratic motion energy such as a wave motion generator having a coil 2310 at the center and following Faraday's law with surrounding permanent magnets 2320-1 through 2320-N where there is a North pole closest the coil 2310 and the south poles comprise a plurality of coils equally spaced about the North pole and the coil. In this example, the number of permanent magnets is eight sets but any number of permanent magnet sets may be used. A bobbin (wing and cap) cover becomes the energy harnessing module and can move in any direction from water wave motion in any direction represented by the outer circle 2350. A plurality of four handling hooks 2330-1 through 2330-4 are shown by way of example for the outer circle 2350. FIG. 23(B) shows the harnessing module 2300 in greater detail and also shows the control and generator module 2340 which may comprise any of the control and generator module discussed above and the energy generator delivers power to a grid 2350.

FIG. 24 shows one example of a control and generator module for the harnessing module 2300 of FIG. 23 having DC outputs #1 and #2 due to erratic motion of the harnessing module 2300 such as wave motion. Harnessing module 2300 may be viewed as analogous to DC generators #1 and #2 for generating variable direct current voltages to charge controllers #1 and #2, 2435-1 and 2435-2, to control the charging and discharging of DC battery 2440. The constant DC generated thereby powers a Hummingbird speed converter 2447 rotary frequency converter comprising direct current (gear) motor 2446 and alternating current generator 2148 for outputting constant frequency alternating current at a constant voltage to the grid (or load) 2450.

FIG. 25 shows another example of an alternating current generator for generating constant frequency and voltage alternating current from a variable rotational speed harnessing module 2510 but this embodiment providing a totally electromotive force (EMF) solution. A plunger 2522 is rotated by the harnessing module 2510 (for wind or for water energy) and is slide-able axially. The plunger is integral with or attached to a permanent magnet rotor 2538 and moves from a position of minimum overlap (low rotational speed) to a position of maximum overlap of rotor and stator (high rotational speed if the wind or river speed is sufficient). There are two separate coils, a solenoid coil 2514 and a stator coil of variable overlap generator for generating the constant frequency alternating current and outputting the alternating current to an electric grid (or load) not shown. As the input shaft through the magnetic gear rotates the plunger, the EMF produced pulls up the plunger 2522. The rotor pulls up also since the plunger and the rotor are attached together. The torque produced by the VO generator will adjust the rpm of the harnessing module 2510 as a reactive feedback This embodiment may be used to harness river or stream energy (unidirectional water flow) and wind energy.

Now FIGS. 1(A)-25 will be described in detail including a design of an EMF direct current generator and various control circuits for generating electric power via any of wind, water, tidal, ocean wave and ocean current energy.

DETAILED DESCRIPTION

In the FIGS. 1(A)-25 of the present embodiments of the invention, an effort has been made to follow a convention such that the first reference number such as 1XX indicates the figure number where the element first appears, for example, Hatch 102 first appearing in FIG. 1. The XX represents an element or component number. Similar reference numerals are used in the Figures to represent similar elements.

Referring now to FIG. 1(A), there is shown a prior art wind or water flow generator which generates power but relatively inefficiently and with maintenance issues when compared with the generator shown in FIG. 1(B). Both FIG. 1(A) and FIG. 1(B) turbines receive variable kinetic energy from, for example, wind or water and generate a constant frequency power output. However, one major difference between FIG. 1(A) and FIG. 1(B) is the prior art use of a variable speed generator to generate variable frequency power. The generated variable frequency power is not useful if it is not capable of being generated at a constant frequency such as 50 Hz European or 60 Hz US. So the variable frequency power is converted by a Power Converter in FIG. 1(A) to direct current power. Then, by way of a variable frequency converter, the direct current generated from the variable frequency power is converted to a relatively constant frequency as seen by the somewhat jagged waveform below for delivery to an electric power grid.

On the other hand, FIG. 1(B) shows the use of a speed converter or a mechanical rotary frequency converter which converts variable speed to a constant and generates a constant frequency output (or constant speed rpm). This output is then provided, for example, to what is referred to in prior patent applications as a variable torque and power generator (VT&PG) and may be controlled via a DC motor and a Hummingbird to generate, for example, a multiple of ten times (or within a range of five to one hundred times) the power rating of the turbines controlled by power converters as will be further explained herein.

FIG. 2 shows a mechanical drawing in perspective view of a basic Transgear™ spur/helical gear assembly which may comprise three (or more) variables. FIG. 2 shows a typical application where the three variables comprise an input, a control and an output (similar mechanically to a transistor for electronic control). In FIG. 2, the input variable may be assigned to the left sun gear 210, the control variable may be assigned to the carrier gears 220 and the output variable may be assigned to the right sun gear 230. The three variables of input, output and control may be variably assigned to six possible assignments of variables as seen in the Table at the right of FIG. 2. Already, the first possible of six assignments has been discussed with the left sun gear, carrier gears and right sun gear shown as header 232 and the assignments already discussed are shown as left sun gear input, carrier gears control and right sun gear output 234. A second assignment of variables 236 may be left sun gear (input), carrier gears (output) and right sun gear (control). A third assignment of variables 238 may be left sun gear (output), carrier gears (control) and right sun gear (input). A fourth assignment of variables 240 may be left sun gear (output), carrier gears (input) and right sun gear (control). A fifth assignment of variables 242 may be left sun gear (control), carrier gears (output) and right sun gear (input). Finally, a sixth assignment of variables 244 may be left sun gear (control), carrier gears (input) and right sun gear (output). The spur/helical gear assembly 200 of FIG. 2 may be used to construct a Hummingbird rotary frequency converter by connecting two such assemblies together and then simplified as will be discussed further herein, for example, with reference to FIG. 4.

FIG. 3 provides a corresponding perspective view of an exemplary MHK river turbine 300, for example, located so as to receive water flow 310 from one direction (such as left to right) and generate electricity via generator (not shown) attached to the output shaft 305 of the control box 304 leading to the generator (not shown). The MHK river turbine 300 may have a sloped block 301 for channeling the water flow 310 toward a hatch 302 which is shown in a partially closed position with respect to a waterwheel 303 having a central shaft (not seen) which turns at variable rotational speed depending on the amount of water flow 310. The waterwheel 303 will turn more freely if the hatch 302 is fully open and exposes the waterwheel 303 to the entire water flow. The hatch 302 may have an associated hatch control as described, for example, in pending patent applications and issued patents and generator control wherein a waterwheel 303 is turned by water flow in proportion to water velocity (faster water flow, faster waterwheel rotational velocity and higher electricity output of the generator). An optional hatch control may open or close the optional hatch 302 to an infinite number of positions over the waterwheel 303 so that maximum or appropriate water flow will drive the waterwheel 303, and a generator (not shown) driven by a gearbox 304 (preferably using magnetic gears) showing output 305 and mechanical speed controls 304 (a mechanical (rotary) frequency converter having three variable controls referred to herein as the Goldfinch or Hummingbird) and a variable torque and power generator (VT&PG) (or fixed torque and power generator, FT&PG) (or variable overlap generator VOG) produce output power at a desired constant frequency to a power grid regardless of input water flow rates from the specified minimum to the maximum. The output shaft or any shaft coupled to the waterwheel may comprise the VT&PG (VO generator) of FIGS. 5 or 6(B) and 6(C) (briefly described below). The rotor and stator of a variable overlap generator may be variably positioned with respect to each other to regulate the output to produce a constant frequency such as 60 Hz (US) or 50 Hz (European) for power generation having constant voltage but current variable with amount and speed of wind/water flow and the turning velocity of the input waterwheel 303. See FIGS. 20(A) through 20(D) for various mounting arrangements of an MHK turbine for capturing two directional tidal energy. As shown in recently allowed patent application, U.S. Ser. No. 14/838,867, filed Aug. 28, 2015, a run-of-river turbine also known as a marine hydrokinetic or MHK turbine is also described in priority U.S. patent application Ser. No. 14/255,377 of Kyung Soo Han filed Apr. 17, 2014, now U.S. Pat. No. 9,151,269, and in priority U.S. patent application Ser. No. 14,838,867 filed Aug. 28, 2015 and issued as U.S. Pat. No. 9,476,401 on Oct. 25, 2016, in two forms, herein called samples, which have been built and tested.

Referring now to FIG. 4, there is shown a Hummingbird two-Transgear assembly control 400 (mechanical rotary frequency converter) having three variables representing variable input, control input and output. A control input $-X$ rpm may be a constant rotational velocity $-X$ which, for example, may be a multiple in RPM of the standard European electrical frequency of 50 Hz (cycles per second) or the US electrical frequency of 60 Hz and output as RPM rotational speed by a constant speed motor (not shown) which may have a gearbox for increasing/decreasing the constant speed). For example, $-X$ rpm may be a value from 600 RPM to 3000 RPM CCW. Now, a variable portion of the speed input is received from a waterwheel or a VAWT or HAWT shaft impacted by gusts or bursts controlled by a magnetic gear set (not shown) which may represent a $+$ or $-\Delta$ (variable change) in rotational speed in RPM when compared with the value of X output by the constant speed motor control variable X. So variable input $X+\Delta$ rpm (or $X-\Delta$ rpm) is received at cross-hatched input shaft of the Hummingbird speed converter. Assuming that the Input to left sun gear of left Transgear assembly=$X+\Delta$ rpm (representing a positive change in speed) then, carrier #1=$(X+\Delta$ rpm$)-X$, control input=$+\Delta$ rpm (provided by the constant speed motor and the net result is $+\Delta$ rpm). On the other hand, by the Transgear rule, Carrier #2=$-\Delta$ rpm. Meanwhile, second sun gear (left sun gear of right Transgear) is also an input $X+\Delta$ rpm and meshes with right spur gear assembly planetary gears on pins of a carrier. Thus, the output to electric power generator (right sun gear of right Transgear) =$(X+\Delta$ rpm$)-\Delta$ rpm=$X$, the desired constant speed output fed to an electric power generator which value is the same X rpm as the constant speed motor rotational speed.

The mechanics are that when the input is to the first sun gear (left sun gear of left Transgear) and the control input is to the right sun gear of left Transgear, and when the two input speeds are not same, turns carrier #1 of the left Transgear assembly which carries right planetary gears which turn on pins. Connecting gear or gears at top connects the two carriers (the left and right Transgear assemblies) and of the two spur gear assemblies connected in series. The difference $+\Delta$ rpm produced by carrier #1 from the first gear assembly (left Transgear) is carried to carrier #2 (the right Transgear assembly) where mathematically Carrier #2=$-\Delta$ rpm according to the Transgear rule. Meanwhile, left sun gear of right Transgear is also an input $X+\Delta$ rpm and the carrier #2 becomes the control input $-\Delta$ rpm. The output of the right Transgear or right sun gear of right Transgear or to the electric power generator is $(X+\Delta$ rpm$)-\Delta$ rpm=$X$. This two-Transgear Hummingbird having many components may be simplified as will be discussed with reference to FIG. 10(B)-10(G).

Per FIG. 5, there is shown a second component of an electric power generator of an embodiment of the present invention, namely, a variable overlap generator (VO generator) described in prior patent applications and priority patents as a variable torque and power generator. FIG. 5 shows a perspective view of a Variable Overlap Generator (VO generator) or Variable Torque and Power Generator (VT&PG) when used in an electric power generator to control torque and power to provide a constant speed generated output when an input is of variable speed. The rotor and the stator are movable axially in relation to one another such that when there is maximum overlap, there is maximum torque and power between rotor and stator. Minimum torque is applied between rotor and stator when there is minimum overlap between rotor and stator. Such a minimum overlap might be used in a slow or low wind or slow current situation to lower the cut-in speed (waterwheel speed) and generate more electricity than if there were a fixed overlap generator which might not operate at all at such slow wind or current. A maximum overlap might be used in an extremely high wind or fast river flow situation to increase the rated speed or rated power and generating more electricity. In summary, operation over a greater range of wind and water speed will be demonstrated using the present invention to generate more electricity and to lower the level of energy cost or provide a low levelized cost of energy (LCOE).

FIGS. 6(A), 6(B) and 6(C) show a fixed overlap generator in FIG. 6(A) which might not move because a minimum water or wind speed might not turn the fixed rotor with respect to the stator at maximum overlap. On the other hand, torque is minimized as the overlap between rotor and stator are decreased as seen in FIG. 6(B) showing a variable overlap generator having a minimum overlap or minimum torque. FIG. 6(C) shows a variable overlap generator with maximum overlap and there is not shown in either FIG. 6(B) or 6(C) a motor or other means of controlling the variable overlap to be at any position between minimum overlap and maximum overlap.

Referring to FIG. 6(D) comprising a table corresponding to FIGS. 6(A) through 6(C), it should be emphasized that the power rating of the variable overlap generator (VO generator or VOG) is greater than that of the fixed overlap generator (FO generator or FOG). A table (FIG. 6(D)) is provided to show the differences between a fixed overlap generator and two positions of a variable overlap generator—minimum and maximum overlap positions. Fixed overlap generator (FIG. 6A) has a fixed overlap between rotor and stator that may not be changed and thus has a fixed, high value of torque and a fixed value of rated power. FIG. 6(B) shows a variable overlap generator having a minimum overlap and a minimum torque, much lower that the fixed torque embodiment of FIG. 6(A). With maximum overlap shown in FIG. 6(C), the torque and power values of the VO generator are greater than that of a fixed overlap generator and so provides a maximum rated power when the wind or water speed are at a maximum. The fixed rated power of a fixed overlap generator may be exceeded by a variable overlap generator at maximum overlap which is shown to be larger than the fixed overlap generator of FIG. 6(A).

Now a brief discussion of Faraday's law is provided as an introduction to the direct current generator of FIG. 7(A). Faraday's law may be stated again as follows: A conductor moving relative to a magnetic field develops an electromotive force (EMF) on the conductor because of the magnetic field, for example, generated by a permanent magnet. This EMF reverses its polarity when the conductor moves under magnetic poles of opposite north and south polarity. A postulate of this law is that a conductor moving relative to a magnetic field develops an electromotive force (EMF) on it, but the EMF generated does not reverse its polarity when the conductor moves under magnetic poles of the same polarity.

A totally electromotive force (EMF) direct current generator will now be described with reference to, for example, FIG. 7(A). DC generators that are currently available typically generate alternating current first which is then rectified or converted to direct current in a second step, for example, using a commutator and a brush and, typically, a rectifier bridge. According to the direct current generator shown in FIG. 7(A), direct current is generated in one step because the DC generator of FIG. 7(A) is a direct current generator having no commutator, brush or rectifier bridge. As will be discussed further herein, this direct current generator of FIG. 7(A) may have reversed rotational directions but develops an EMF, for example, in either direction of water flow (tidal energy) or when the permanent magnet erratically moves due to an ocean wave.

FIG. 7(A) shows a cross-sectional view with the shaft portion 710 coming out of the page. The shaft may turn a rotor comprising a plurality of South/North (or North/South) permanent magnets 720 (a south side shown closest to rotatable shaft 710) with respect to an equal number of equally spaced coils surrounding the shaft as a stator 730. There are, for example, between four and eight, for example, six shown permanent magnets 720 and an equivalent number of six coils (the six coils being connected in series) as a stator 730 shown as the permanent magnet sets of, for example, four to eight sets turn as a rotor connected to or mounted on rotatable shaft 710 (which may rotate in either a clock-wise or counter clock-wise direction). Direct current output is taken from the series-connected stator as seen, for example, in FIG. 7B. FIG. 7B only shows two electric coils connected in series as a stator surrounding two permanent magnets where the North pole of each magnet is facing the coil 730 and the South pole faces a shaft not shown. (There may be a range of values or numbers of magnets and coils depending on the application). Such a permanent magnet direct current generator is simple and durable in design and not prone to shorts in a commutator or brushes which may deteriorate over time because there are no commutators or brushes. Reversing rotational direction still generates direct current, for example, in the application of harnessing energy from a tidal estuary or high and low tides movement of water. Similarly, the design may permit reciprocating magnetic polarity to generate direct current power, for example, when the design is tuned for erratic movement energy such as ocean wave energy.

FIG. 7(B) on the other and provides a simple schematic circuit of the direct current generator of FIG. 7(A). A single coil 730 is shown facing a N/S polarity permanent magnet, by way of example, which may move with respect to the coil of wire (electrically conducive coil) or, vice versa, the coil may move with respect to the permanent magnet. A direct current voltage is generated represented by VDC or voltage direct current. This DC generator or earlier, known, commutator, brush direct current motors may be used in the following applications for generating power, for example, for a power grid. The following control circuits may utilize a rotary frequency converter or a Hummingbird mechanical rotary frequency converter and comprise a harnessing module for harnessing kinetic energy, a controlling module and a generating module (referred to herein as a C and G module). The DC Generator of FIG. 7(A) or 7(B) may be utilized as the DC generator(s) shown in any of FIGS. 8, 9, 14, 16, 18 and 21.

A total of five control circuits for use in generating renewable energy by, for example, water flow or wind velocity are shown in FIGS. 8, 9, 14, 15 and 25. FIG. 8 shows an application which may be referred to as Control Circuit #1 for providing constant frequency and voltage power from a variable speed input. Control Circuit #1 800 comprises a harnessing module 810 which is exemplified by a waterwheel driven by water flow or by rotor blades which may be exemplified by a wind turbine propeller. A DC generator 820 is attached to the input shaft and generates direct current. The harnessing module 810 is preferably coupled to a DC Generator 825 according to FIG. 7(A) via a set of magnetic gears (not shown) to protect the DC generator in the event of strong gusts of winds. The DC Generator 825 generates direct current in varying quantity depending on the water flow (waterwheels) or wind velocity (rotor blades). The DC generator 825 output is connected to a respective charge controller. The known charge controller 835 may be connected between the DC generator 825 and a battery 840 of constant direct current voltage output to protect the battery 840 in the event of overcharging and vice versa to regulate the input of direct current so that the battery 840 may be charged. The joined output of the charge controller and battery are connected to a rotary frequency converter 845, for example, of the type first shown in FIG. 4. By way of example, a DC (gear) motor 846 at one megawatt at constant frequency and voltage alternating current may operate a variable overlap generator 848 also operating at the exemplary one megawatt. The VO generator 848 then outputs in this example one megawatt of constant frequency alternating current electric power to grid (or load) 850. Control Circuit #1 is a basic control circuit.

FIG. 9 shows an exemplary application which may be referred to as Control Circuit #2 which may generate more electricity than, for example, the one megawatt of alternating current power of the embodiment of FIG. 8. The theory behind Control Circuit #2 is that the more DC generators and respective charge controllers, the greater the electricity output. In other words, increasing the number of DC charge controllers increases the power range of the DC gear motor 946. A magnetic gear set 912 is shown between the harnessing module 910 and a pair of DC generators 925-1 and 925-2, preferably similar to the DC generator of FIG. 7(A). It is suggested that twice the generating capability of an exemplary one megawatt will be output from the two DC generators (or a single DC generator with two taps) and respective charge controllers. Each DC generator will feed its, exemplary, one megawatt to a first charge controller 935-1 and one megawatt to a second charge controller 935-2 which regulate power to battery 940. As in FIG. 8, the output, now doubled to two megawatts is provided to a DC (gear) motor 946 and then to a variable overlap alternating current generator which regulates to constant frequency alternating current which is then fed to grid (or load) 950.

FIG. 10(A) provides a schematic (developed by DDMotion) of a renewable energy generator comprising the mechanical rotary frequency converter for providing a three-variable mechanical control, Hummingbird, using symbols for input, output and control variables as first shown in FIG. 4. FIGS. 10(B) through 10(G) show one sequence of steps of simplification of side-by-side, two Transgear spur/helical gear assemblies (FIG. 4) such as seen in FIG. 10(B) to a thin, simple, and efficient speed control gear assembly having a common sun gear in the middle of the shaft 1041 in FIG. 10(G), both the shaft and sun gear shown in cross-hatching.

FIG. 10(A) provides a symbol for a Hummingbird 1000 for the two side-by-side Transgear assemblies of FIGS. 5 and 6 with the control input from a constant speed motor entering from the left, the input from a variable speed VAWT, HAWT or MHK turbine shaft varied typically by a magnetic gear (gearbox) entering from the top, and the output to an electricity generator (such as a variable output generator) outputting from the right. FIG. 10(B) is identical to control 400 of FIG. 4. FIG. 10(B) may be modified to its mechanical equivalent FIG. 10(C) by swapping positions of input gear (left sun gear of left Transgear) 1037 and control gear (right sun gear of left Transgear) 1038, now re-numbered the input gear from before and the control gear from before 1038. Note that connecting gear 1035 is tightened between FIG. 10(B) and FIG. 10(C). FIG. 10(C) may be further simplified to its mechanical equivalent FIG. 10(D) by using longer pins to attach two Transgear carrier gears (connecting gear 1035 is no more necessary and four carrier gears become circles or brackets or without gear teeth). FIG. 10(D) may be further simplified to its mechanical equivalent by reducing the redundancy, for example, the two input sun gears 1037 and 1039 into one central sun gear 1041 and two sets of planetary gears into one set (at top and bottom). The two sun gears 1037 and 1039, one on the left and one on the right, in FIG. 10(D) may be reduced to one central sun gear 1041 as shown in FIG. 10(E) to FIG. 10(F). When the diameters of two sun gears 1038 and 1040 are reduced to 1038A and 1040A so that they do not accidentally mesh with planetary gear 1050, as shown in FIG. 10(F), the assembly may have a narrower profile now by pushing the two smaller sun gears 1038A and 1040A toward the center sun gear 1041 of the shaft as shown in FIG. 10(G). All FIGS. 10(B)-10(G) are Hummingbird in different shapes and may be presented by a schematic shown in FIG. 10(A). Other simplifications than those shown may be made by one of ordinary skill in the art to the embodiments of FIGS. 10(B)-10(G) without varying from the scope of the invention.

FIG. 10(G) is derived from FIG. 10(F) by simply removing excess space from between the gears, shafts, carriers and pins of FIG. 10(F). FIG. 10(G) is simply a more condensed combination of simpler designs than those of FIGS. 10(B)-10(F).

FIGS. 11(A) and 11(B), first shown in FIG. 10(G), show a simplified mechanical rotary frequency converter (or simplified Hummingbird) comprising a three variable control, Hummingbird, in section A-A view (FIG. 11(A)) and front view (FIG. 11(B)) respectively having a Long Gear at top where FIG. 11(B) shows three sets of two planetary gears equally spaced about the shaft 1102 for meshing with three sun gears, left, middle, and center, with sleeves centered around a central input shaft, middle sun gear 1141 connected to input shaft 1102 with a larger attached or integral input sun gear 1141. FIG. 11(A) provides a section view of a simplified Hummingbird three variable control 1100 as seen in front view in FIG. 11(B). FIG. 11(B) in turn is taken from a simplified, condensed three-variable Hummingbird control taken from FIG. 10(G). Note the Long Gear at the top center.

FIGS. 12(A) and 12(B) show a Triple Gear at the top center of a Hummingbird. FIGS. 11(B) and 12(B) each show three sets of two planetary gears equally spaced around central sun gear and integral or attached carrier with the bottom planetary gear sets meshed with the sleeve and the top planetary gear set meshed with the central sun gear respectively. It is optional to have more or fewer number of planetary gear sets as needed. A cautionary detail about the number of planetary gears meshing with a sun gear may be useful for the number of teeth on each gear of a set of gears. If the number of planetary gears meshing with a sun gear is more than one, for example, three planetary gears, the number of sun gear teeth should be a multiple of the number of planetary gears. For example, if there are three planetary gears meshing with a sun gear, the gear teeth should be the multiple of three (3). Four gears should have a multiple of four (4) teeth.

FIGS. 12(A) and 12(B) show a Triple Gear variation 1200 of Hummingbird shown in FIGS. 10(G) or 11(A) and 11(B). A major difference is that the planetary gears shown in FIG. 12(A) are triple gears with one large gear in the middle and two smaller diameter gears on the left and right sides. FIG. 12(A) is functionally equivalent to other Hummingbird embodiments but has three sets of triple gear planetary gears. The central shaft 1202 comprises the input and has a sun gear 1241 meshing with the planetary gear set at top. FIG. 12(B) shows the three sets of equally spaced planetary gears of different diameters including one triple gear in each planetary gear set of two gears each. It is optional to have more or a fewer number of planetary gear sets as needed. A cautionary detail about the number of planetary gears is the number of teeth on each gear. Again, as suggested above, if the number of planetary gears meshing with a sun gear is more than one, the number of gear teeth should be a multiple of the number of planetary gears. For example, if there are three planetary gears meshing with a sun gear, the gear teeth should be a multiple of three (3). Another cautionary detail about the multiple sets of double, triple or multiple gears meshing with a single sun gear is that they may have to have teeth alignment. For example, it is more obvious when one of the smaller (planetary) gears is meshing with a common sun gear. If they are not aligned, they may not mesh properly. A solution may be to use the same number of teeth for both large and small gears but with different pitches of teeth.

FIG. 12(A) and FIG. 12(B) show a further, second variation of a simplified Hummingbird three variable control 1200 along section A-A (FIG. 12(A)) utilizing a different type of planetary gear (Triple Gear shown at top), three different equally spaced, and different diameter planetary gear sets as best seen in FIG. 12(B) where a first set of planetary gears shown in FIGS. 12(A) and 12(B) as Triple Gears with different diameters at left, wider at center and right and a second set of planetary gears shown in FIG. 12(B) both being one gear thick. Note the extension of shaft, sun gear 1241 to, for example, waterwheel input shaft 1202.

FIG. 13(A) shows a further simplified Hummingbird comprising a basic three variable spur/helical gear Transgear gear assembly 1300 while FIG. 13(B) shows an assembly of FIG. 13(A) emphasizing the three variables only, two sun gears 1310, 1320 and a carrier 1330, while FIG. 13(C) represents a symbol for a Transgear gear assembly (Hummingbird) having a control, an input and an output which may comprise the three leads 1310 (input), 1320 (output), 1330 (zig-zag control) to the depicted symbol used herein as a shortcut means to display a Hummingbird mechanical rotary speed converter.

FIGS. 13(A), 13(B) and 13(C) show the steps of developing a simple symbol shown in FIG. 13(C) for the various three variable spur/helical Transgear gear assemblies shown in this and priority patent applications and patents. Referring to FIGS. 13(A) and 13(B), the figures provide a more complex and a simple view of a basic spur gear three variable Transgear™ gear assembly having a sheath/sleeve integral with or attached to a left sun gear (which may be a first assigned variable, input, output or control). In this embodiment, the gear assembly may be three gears wide. On the other hand, if carrier gears are carrier gears, the assembly may be five gears wide (not shown). A first assignable variable may be the first sun gear. A second assignable variable may be the carrier. A third assignable variable may be the second sun gear. There are also shown a set (pairs) of two planetary gears. FIG. 13(A) shows a layout of a basic three variable spur gear assembly showing variables 1310, 1320 and 1330 and FIG. 13(B) shows a basic spur gear assembly showing the same three variables without planetary gears, two sun gears 1310 and 1320 (one on a sleeve, the other attached or integral with the carrier) and a carrier 1330 (for the planetary gears). The simple symbol of FIG. 13(C) shows an input, an output and a control variable of a simple three variable spur/helical gear assembly, the symbol representing two sun gears 1310 (input), 1320 (output) in triangles and a carrier 1330 (control) represented as a zig-zag line in the middle totaling the three variables.

FIG. 14 is a block diagram of a Control Circuit #3 (comprising a mechanical rotary frequency converter or Hummingbird 1446) being a layout of a two Transgear assembly (FIG. 10(B) and comprises a harnessing module 1410, a magnetic gear set 1412 to protect against high wind velocity or strong water flow, first direct current generator 1425-1 and second direct current generator 1425-2 each producing, for example, one megawatt to respective first charge controller 1435-1 and second charge controller 1435-2 to regulate charging of battery 1440 for providing, for example, two megawatts of direct current to the mechanical rotary frequency converter comprising a direct current gear motor 1446 output to Hummingbird 1447 to variable output generator 1448 generating a multiple of two megawatts, such as twenty megawatts, of alternating current to grid (or load) 1450. Control circuit #3, for example, may be utilized in a river or ocean turbine as shown in FIG. 16 subsequently discussed herein, a wind turbine shown in FIG. 18 herein, a tidal turbine shown in FIG. 21 herein and an ocean wave turbine shown in FIG. 24 herein.

FIG. 15 is a block diagram of a Control Circuit #4 which may generate as much power is needed for a particular application. Harnessing module 1510 may be used to harness renewable wind and water energy sources and magnetic gear set 1512 may protect an input shaft from a mechanical breakage of gear teeth. A variable overlap generator 1548 is shown in more detail showing, for example, the rotor 1517 displaced from the stator 1518 and having a coil 1410, a magnet 1516, a control 1536 and a spring 1521 and adjust screw 1519 for controlling the displacement of the rotor 1517 from the stator 1518 during varying conditions of velocity of wind and water. The output of the control module 1536 is provided to a, for example, ten mega-watt direct current motor 1544 for output to a Hummingbird mechanical rotary speed converter 1546 for outputting a constant speed to alternating current generator 1548. If wind and water are flowing fast enough, the VO generator 1548, control 1536 and motor 1544 will work together with a Hummingbird mechanical rotary speed converter to provide a constant large output power via alternating current generator 1548 such as one hundred megawatts to grid (or load) 1550. The variable output generator 1548 may be regulated between minimum and maximum overlap to provide whatever output may be desired given a constant output motor 1544 producing, for example, ten megawatts. Control circuit #4 is shown utilized in a river or ocean turbine embodiment shown in FIG. 17 discussed subsequently herein, in a wind turbine shown in FIG. 19 herein and in a tidal turbine shown in FIG. 22 herein.

FIG. 16 depicts a first block diagram of a control circuit #3 developed especially for use with river or ocean currents (unidirectional current flow) using, for example, two direct current generator assemblies 1625-1 and 1625-2 side-by-side where the central waterwheel shaft comprises the input to a buffering magnetic gear set in the event of storm water flow, the output of the DC generators being provided respectively as discussed before to respective charge controllers 1635-1 and 1635-2, the charge controllers regulating the amount of charge to direct current battery 1640 which output is provided to a direct current gear motor 1646 and from the motor 1646 to a Hummingbird Transgear speed control assembly 1647. Hummingbird 1647 provides a constant frequency output to variable output generator 1648 which provides alternating current power to a grid (or load) 1650.

FIG. 17 shows a schematic of a control circuit #4 for a river or ocean current (unidirectional water flow) where a waterwheel harnessing module 1710 outputs a variable rotational velocity input to magnetic gear set 1712 which controls by slipping for storm water and then the output of the magnetic gear set 1712 is provided to a variable output generator 1748 comprising as discussed before, a rotor 1717, a stator 1718, a coil 1714, a magnet 1716, a spring 1721, an adjust screw 1719 and a control 1736 for providing output to a DC control motor 1744, the VO generator 1748 and motor 1744 for providing input to a Hummingbird speed converter 1746 providing a constant speed output to an alternating current generator 1748 which in turn provides alternating current power to a grid (or load) 1750. If the constant direct current motor operates at, for example, ten megawatts, then, the control circuit #4 may operate at, for example, 100 megawatts.

FIG. 18 provides a block diagram of a control circuit #3 for either a horizontal or a vertical axis wind turbine, HAWT or VAWT, where more electricity is generated and the rated power of the charge controllers is increased accordingly. The harnessing module 1810 comprises a propeller or rotor coupled to a magnetic gear set 1812 to protect against heavy gusts of wind. The magnetic gear shaft is input to first and second direct current generators 1825-1 and 1825-2 and respective charge controllers 1835-1 and 1835-2 for controlling the charging of batter 1840. Battery 1840 powers DC gear control motor for input to a Hummingbird speed converter 1847 which provides a constant speed input to Hummingbird 1847. Hummingbird 1847 provides a constant input to variable output alternating current generator 1848 for outputting electricity to grid (or load) 1850.

FIG. 19 provides a block diagram of a control circuit #4 for either a horizontal or a vertical axis wind turbine, HAWT or VAWT. A harnessing module 1910 comprises a propeller or rotor coupled to a magnetic gear set 1912 to protect against heavy wind gusts. The magnetic gear set shaft is input to a variable overlap generator 1948 comprising a rotor 1917 and stator 1918 axially movable with respect to one another via coil 1914, magnet 1916, screw 1919 and spring 1921. For example, a screw 1919 and spring 1921 may be controlled by control 1936 to move rotor 1916 proximate stator 1918 or to a minimum overlap position shown. A similar spring 2221 and screw 2219 are shown in FIG. 22 for moving rotor 2217 from a minimum overlap position shown to a maximum overlap position with stator 2218. Control 1936 connected to coil 1914 and stator 1918 outputs a constant output when compared with the variable propeller 1910 output to constant motor 1944, for example, operating at ten megawatts. Hummingbird 1946 receives an input from the shaft and from motor 1944 to deliver a constant speed input to generator 1948 which, for example, may output one hundred megawatts of electricity compared with, for example, just ten megawatts of direct current control motor 1944 to grid (or load) 1950.

FIG. 20(A) through FIG. 20(D) provide arrangements of harnessing modules for harnessing power from tidal estuaries where current is bi-directional. FIG. 20(A) shows water flow entering from the left and causing a harnessing module waterwheel to turn clockwise (CW). FIG. 20(B) shows water flow entering from the right and causing a harnessing module waterwheel to turn counter-clockwise (CCW). FIG. 20(C) shows two units in series. FIG. 20(D) shows two units in parallel. Multiple waterwheels (more than two) may be provided in alternative embodiments, stacked vertically or in series as in FIG. 20(C) or otherwise designed to multiply the amount of power generated in a tidal, flow in, flow out, flow of water.

FIG. 21 provides a block diagram for a tidal turbine, a horizontal or vertical axis wind turbine (HAWT or VAWT) control circuit #3 where the reverse tidal flow also generates DC power. If the DC (gear) motor is, for example, at two megawatts, then, the output to the grid 2150 may be, for example, ten times as great or twenty megawatts. Waterwheel 2110 is protected by magnetic gear set 2112. An un-numbered shaft runs from waterwheel 2110 to magnetic gear 2112 but may slip at magnetic gear 2112 before the shaft is received at, for example, DC Generators 2125-1 and 2125-2. The shaft output of magnetic gear 2112 drives DC generators 2125-1 and 2125-2. More DC generators may be provided to output more power. Each DC generator output is controlled by a charge controller (discussed above for charging or precluding a discharging and deadening of battery(ies) 2140 where charge controller #1 2135-1 in fed by DC generator #1 2125-1 and charge controller #2 is fed by DC generator #2 2125-2. The charge controllers regulate the charging and discharging of battery(ies) 2140 which outputs direct current to operate direct current gear motor 2146. DC (gear) motor 2146 outputs to variable overlap generator (VO Generator) 2148 for outputting alternating current power to grid (or load) 2150.

FIG. 22 provides a block diagram for a tidal turbine, a horizontal or vertical axis wind turbine (HAWT or VAWT) control circuit #4 where the tidal or unidirectional water flow power may be, for example, ten megawatts. If the motor 2244 is, for example, at a range of about five megawatts, then, the output to the grid 2250 may be, for example, ten megawatts.

FIG. 23(A) provides a first view of a harnessing module 2300 for an erratic motion energy such as a wave motion generator having a stator coil 2310 at the center and following Faraday's law with surrounding moveable rotor permanent magnets 2320-1 through 2320-N where there is a North pole closest the coil 2310 and the south poles comprise a plurality of coils equally spaced about the North pole and the stator coil. In this example, the number of permanent magnets is, for example, eight sets. A harnessing module (FIG. 23(A)) comprises a circular wing and ball and socket (best seen in FIG. 23(B)) such that permanent magnets may move in any direction from water wave motion represented by the outer circle including hooks 2330-1 through 2330-4. A plurality of four hooks 2330-1 through 2330-4 are shown by way of example for the outer circle (wing and socket) feeding power to grid 2350. FIG. 23(B) shows the harnessing module 2300 in greater detail with the wing and socket shown in cross-section and also shows the control and generator module 2340 which may comprise any of the control and generator module discussed above and the energy generator delivers power to a grid 2350. Regarding the socket in particular of FIG. 23(B) the socket may be seen to be bowl-shaped (without the bottom) and comprise the, for example, eight sets of magnets which move about a coil 2310 which picks up the generated EMF and delivers the EMF generated to the C and G module 2340 (control and generating module).

FIG. 24 shows one example of a control and generator module for the harnessing module 2300 of FIG. 23 having DC outputs #1 and #2 due to erratic motion of the harnessing module 2300 such as wave motion. Harnessing module 2300 may be viewed as analogous to DC generators #1 and #2 for generating variable direct current voltages to charge controllers #1 2435-1 and 2435-2. The charge controllers control the charging and discharging of DC battery 2440 and preclude the battery(ies) from going dead by cutting their output to power DC motor 2446. The DC battery(ies) 2440 powers a Hummingbird speed converter 2147 rotary frequency converter comprising direct current gear motor 2446 and alternating current generator 24448 for outputting constant frequency alternating current at a constant voltage to the grid (or load) 2450.

FIG. 25 shows a control circuit #5 which is a solenoid-controlled variable overlap generator (VO Generator). A harnessing module (wind or water) drives a controlling and generating module having a variable power solenoid and a VO Generator portions. A magnetic gear 2512 may separate the harnessing module from the C and G module. The C and G module comprises a plunger 2535 connected to a rotor 2540 and are shown at minimum overlap with coil 2530 and stator 2540. Control circuit #5 is another example of an alternating current generator 2500 for generating constant frequency and voltage alternating current to a grid 2550 from a variable rotational speed harnessing module 2510 providing a totally EMF solution for generating constant frequency alternating current at constant voltage. A sideways orientation is shown where it may be assumed that, for example, water flow or wind direction may cause the harnessing module 2510 to rotate in either a clockwise or a counterclockwise direction when the wind cut-in speed or water flow rate is reached to turn a waterwheel or propeller or rotor or there is sufficient water to cause the waterwheel or rotor to rotate. A flywheel may be used and is not shown between the harnessing module 2510 and the magnetic gear set 2512 which as indicated above may protect the apparatus from high wind speed gusts and storm water flow conditions. A plunger 2522 is rotated by the harnessing module 2510 (for wind or for water energy) and is slide-able axially from a minimum overlap to a maximum overlap position. The plunger 2522 is integral with or attached to a permanent magnet rotor 2538 and moves from a position of minimum overlap (low rotational speed) to a position of maximum overlap of rotor and stator (high rotational speed if the wind or river speed is sufficient). There are two separate coils, a solenoid coil 2530 and a stator coil 2540 of variable overlap generator 2548 for generating the constant frequency alternating current and outputting the alternating current to an electric grid (or load) not shown. As the input shaft through the magnetic gear 2512 rotates the plunger 2535, the EMF produced pulls up the plunger 2535. The rotor 2538 pulls up also since the plunger and the rotor are attached together. The torque produced by the VO generator 2548 will adjust the rpm of the harnessing module 2510 as a reactive feedback. This embodiment may be used to harness river or stream energy (unidirectional water flow) and wind energy. Other applications may be used depending on wind or water flow characteristics.

The principles of application of the several discussed embodiments of a structure and method of constructing same for, for example, providing a green energy alternative to the burning of fuel such as coal, oil or other less environmentally friendly energy sources have been demonstrated above using a spur/helical gear assembly of sun gears and planetary gears and a variable overlap generator or VT&PG control assembly, for example, in a wind or MHK turbine electric power generator. A commutator-less and brushless direct current generator is disclosed which may operate at high efficiency and low maintenance in unusual conditions such as with tidal and wave energy. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). A three variable to constant speed converter may be of the Goldfinch or Hummingbird type and include a constant speed motor for controlling the output speed at a constant along with use of a variable power generator in these embodiments. These and other features of embodiments and aspects of a variable flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A marine hydrokinetic or wind power electricity generator, the generator comprising:
    a gear set coupled to one of a propeller shaft and a waterwheel shaft, the propeller shaft and waterwheel shaft comprising a renewable energy receiving component of a harnessing module,
    a direct current generator of a controlling module connected to the harnessing module, the direct current generator comprising no commutator or brush and generates electromotive force,
    a rotary frequency converter of a generating module for generating electricity to a grid connected to the controlling module, the mechanical rotary frequency converter, responsive to one of a waterwheel shaft and a propeller shaft, the comprising a direct current motor and a variable overlap generator,
    the variable overlap generator of the mechanical rotary frequency converter comprising a rotor and a stator axially adjustable along the output shaft so that the rotor may be displaced with respect to the stator or the stator may be displaced with respect to the rotor, the variable overlap generator with a minimum displacement and complete overlap of rotor and stator and a maximum torque value in one position and with a maximum displacement and relative non-overlap of rotor and stator and a minimum torque value in another position,
    an input shaft of one of a propeller shaft and a waterwheel shaft of the harnessing module for rotating at a rotational velocity depending on one of wind speed and water flow rate and an output shaft of the generating module for rotating at a different constant rotational velocity, and an electric grid, responsive to the variable overlap generator, for generating electricity at constant frequency and voltage.

2. The marine hydrokinetic electric or wind power generator of claim 1 further comprising one of a river flow and wind speed coil and control for actuating operation of the variable overlap generator.

3. The marine hydrokinetic electric or wind power generator of claim 1, the direct current motor further comprising a constant frequency motor for controlling the variable overlap generator at constant frequency output to the grid.

4. The marine hydrokinetic electric or wind power generator of claim 1 further comprising a spring and adjust screw for adjusting the position of the rotor with respect to the stator of the variable overlap generator, the rotor being integral with or connected to an output shaft coupled via a three variable mechanical control to the electric grid.

5. The marine hydrokinetic electric or wind power generator of claim 4 wherein the stator outputs a higher value of electric power than a conventional marine hydrokinetic or river turbine given the same amount of input water flow or wind velocity.

6. The marine hydrokinetic electric or wind power generator of claim 2, the marine hydrokinetic electric power generator further comprising a hatch control of a waterwheel for providing an output to control hatch position with respect to the waterwheel of the harnessing module of the marine hydrokinetic electric generator and controlling the variable overlap generator output to a relatively constant frequency and voltage.

7. The marine hydrokinetic electric or wind power generator as recited in claim 1 wherein an input shaft from the harnessing module is coupled to the rotor of the variable overlap generator via the gear set, the rotor being coupled to one of the input shaft and to an output shaft of an electric generator of one of a marine hydrokinetic or wind turbine, the input shaft being protected by the gear set, the gear set comprising a magnetic gear set, the magnetic gear set intentionally slipping in periods of high wind gusts or storm water flow.

8. The marine hydrokinetic or wind power generator as recited in claim 1, an input shaft of the harnessing module coupled to the rotor of the variable overlap generator via the gear set, the rotor being integral with or connected to a shaft output of the gear set and to a three variable control of the marine hydrokinetic or wind power generator at constant rotational velocity.

9. The marine hydrokinetic or wind power generator as recited in claim 1 wherein the variable overlap generator comprises the rotor and the stator, the stator being moveable axially with respect to the rotor and the rotor is integral with or connected to the shaft of the variable overlap generator of the marine hydrokinetic or wind power generator and the variable overlap generator is coupled to an electric grid to deliver alternating current power.

10. The marine hydrokinetic or wind power generator as recited in claim 1, the rotary frequency converter comprising a dual spur/helical gear assembly speed converter, the dual spur/helical gear assembly able to be reduced in part count and size to one of a three gear width, a two gear width and a single gear width spur/helical gear assembly having three variables.

11. The marine hydrokinetic or wind power generator as recited in claim 1 for generating alternating current power at constant frequency and voltage where an input shaft of a harnessing module is driven by water at variable rotational speed, the marine hydrokinetic power generator comprising:

the gear set being connected to the waterwheel shaft, the gear set comprising a magnetic gear set coupled to the waterwheel shaft, the magnetic gear set comprising magnetic gears for slipping when a predetermined value of torque is exceeded in the event of bursts of water flow.

12. A marine hydrokinetic or wind electric power generator as recited in claim 7, the electric generator having a shaft integral with or attached to a rotor of a variable overlap generator and a solenoid coil, the generator further comprising a stator axially surrounding the rotor and the rotor axially displaceable with respect to the stator by a plunger driven by a control connected to a coil surrounding the shaft for moving the rotor with respect to the stator, the rotor comprising a permanent magnet and being moveable from a minimum overlap position to a position of maximum overlap with the stator and maximum speed, the electric generator for outputting a constant alternating current electric voltage at a constant frequency variable in power by the rotational speed of the harnessing module.

13. The marine hydrokinetic electric power generator of claim 11 adaptable for use in a marine hydrokinetic turbine for regulating variable water flow velocity turning a waterwheel harnessing module with respect to outputting constant desired electric power output frequency.

14. The marine hydrokinetic generator of claim 11 further comprising an input shaft coupled to the generator shaft through the magnetic gear set, the magnetic gear set having magnetic gears which slip in the presence of large bursts of water energy when a predetermined value of torque between magnetic gears is reached.

15. The marine hydrokinetic or wind power generator as recited in claim 1, wherein the commutator-less and brush-less direct current generator comprises a shaft for turning a rotor comprising a plurality of one of south/north and north/south permanent magnets and a stator comprising a plurality of equally spaced coils.

16. The marine hydrokinetic or wind power generator as recited in claim 15, the commutator-less and brush-less direct current generator comprises between four and eight permanent magnets and between four and eight equally spaced coils.

17. The marine hydrokinetic or wind power generator as recited in claim 1 comprising a charge controller and a battery for maintaining power to the direct current motor.

18. The marine hydrokinetic or wind power generator as recited in claim 17 wherein the direct current motor provides constant power at constant frequency to the rotary frequency converter.

19. The marine hydrokinetic or wind power generator as recited in claim 17 comprising a plurality of charge controllers.

20. The marine hydrokinetic or wind power generator as recited in claim 1 wherein the power generated via the rotary frequency converter for output to an electric grid is approximately ten times the power output of the direct current motor.

* * * * *